US012380835B2

(12) United States Patent
Le et al.

(10) Patent No.: US 12,380,835 B2
(45) Date of Patent: Aug. 5, 2025

(54) ELECTRONIC DISPLAY PIXEL GROUPING TO MITIGATE MOTION BLUR

(71) Applicant: Apple Inc., Cupertino, CA (US)

(72) Inventors: Chengrui Le, San Jose, CA (US); Fang-Cheng Lin, San Jose, CA (US); Hyunwoo Nho, Palo Alto, CA (US); Lingyu Hong, San Jose, CA (US); Yi-Pai Huang, Cupertino, CA (US); Ze Yuan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/223,794

(22) Filed: Jul. 19, 2023

(65) Prior Publication Data

US 2024/0054942 A1 Feb. 15, 2024

Related U.S. Application Data

(60) Provisional application No. 63/397,627, filed on Aug. 12, 2022.

(51) Int. Cl.
*G09G 3/32* (2016.01)
*G09G 3/3208* (2016.01)
*G09G 3/36* (2006.01)

(52) U.S. Cl.
CPC ............. *G09G 3/32* (2013.01); *G09G 3/3208* (2013.01); *G09G 3/3611* (2013.01); *G09G 2300/06* (2013.01); *G09G 2310/08* (2013.01); *G09G 2320/0261* (2013.01); *G09G 2340/0435* (2013.01)

(58) Field of Classification Search
CPC ...... G09G 3/32; G09G 3/3208; G09G 3/3611; G09G 2300/06; G09G 2310/08; G09G 2320/0261; G09G 2340/0435
See application file for complete search history.

(56) References Cited

U.S. PATENT DOCUMENTS

| | | | | |
|---|---|---|---|---|
| 12,142,198 | B1 * | 11/2024 | Watanabe | G09G 3/32 |
| 2004/0164980 | A1 | 8/2004 | Hewlett | |
| 2006/0110072 | A1 | 5/2006 | Domera-Venkata | |
| 2006/0279478 | A1 | 12/2006 | Ikegami | |
| 2008/0131028 | A1 | 6/2008 | Pillman et al. | |
| 2009/0141980 | A1 * | 6/2009 | Elliott | G09G 5/00 382/190 |
| 2010/0295844 | A1 | 11/2010 | Hayashi | |
| 2011/0069225 | A1 | 3/2011 | Routhier et al. | |
| 2020/0098324 | A1 * | 3/2020 | Li | G02B 27/017 |
| 2020/0320676 | A1 * | 10/2020 | Hardy | G08G 1/09623 |
| 2020/0320945 | A1 * | 10/2020 | Du | G09G 3/3266 |
| 2020/0320947 | A1 * | 10/2020 | Shi | G11C 19/28 |
| 2022/0122519 | A1 * | 4/2022 | Bower | H01L 25/167 |
| 2023/0015213 | A1 * | 1/2023 | Kim | G09G 3/3266 |

* cited by examiner

*Primary Examiner* — Sejoon Ahn
(74) *Attorney, Agent, or Firm* — Fletcher Yoder, P.C.

(57) ABSTRACT

Electronic devices, displays, and methods are provided for performing pixel grouping to enable efficient display operation at higher frame rates and lower image resolutions without sacrificing significant image quality. An electronic display may include a number of rows of display pixels and driving circuitry. The driving circuitry may receive a frame of image data and drive a set of adjacent groups of rows of equal number using the frame of image data. Adjacent groups of rows may respectively include two or more adjacent rows.

22 Claims, 22 Drawing Sheets

ELECTRONIC DISPLAY PIXEL GROUPING TO MITIGATE MOTION BLUR

CROSS-REFERENCE TO RELATED APPLICATIONS

This application claims priority from and the benefit of U.S. Provisional Application No. 63/397,627, entitled "ELECTRONIC DISPLAY PIXEL GROUPING TO MITIGATE MOTION BLUR," filed Aug. 12, 2022, which is hereby incorporated by reference in its entirety for all purposes.

SUMMARY

The present disclosure relates to pixel grouping on electronic displays to enable efficient higher refresh rates at lower resolutions while reducing an impact to image quality.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Numerous electronic devices—such as computers, mobile phones, portable media devices, tablets, televisions, virtual-reality headsets, and vehicle dashboards, among many others—often include electronic displays. To display an image, an electronic display may control light emission of its display pixels based on corresponding image data for the display pixels. By emitting light in various brightness values at different display pixels according to the image data, the electronic display may present an image.

An electronic device may generate image frames of image data for display on an electronic display at a rate known as the frame rate. In many cases, the higher the frame rate, the smoother the appearance of motion on the electronic display, thereby reducing motion blur. For example, some video content could appear choppy or to exhibit motion blur at a frame rate of 60 Hertz (Hz) but might appear very smooth at a frame rate of 240 Hz or higher. While a higher frame rate may be visually desirable, operating at a higher frame rate may consume significantly more energy. Indeed, at full resolution (where image data is generated for all display pixels of the electronic display), generating and displaying image data at a 240 Hz frame rate as compared to a 60 Hz frame rate could consume four times as many resources.

To increase the frame rate without consuming as much power, the electronic device may generate image frames of image data at a lower resolution. For example, at half resolution (where image data is generated for half the number of rows of display pixels of the electronic display) or quarter resolution (where image data is generated for one-fourth the number of rows of display pixels of the electronic display), the electronic device may generate frames of image data at a higher frame rate without consuming as much power.

Pixel grouping on the electronic display may mitigate the potential image quality reduction due to a loss of resolution from full resolution to a lower resolution. Indeed, as described in greater detail below, the electronic display may drive groups of pixels at the same time using lower-resolution image data. By changing the pixel grouping from frame to frame, the human eye may integrate the half-resolution images on the electronic display to cause the half-resolution images to appear to have greater resolution. Thus, for certain applications that call for a higher frame rate, lower-resolution image data may be provided at the higher frame rate and displayed in pixel groups that shift from frame to frame. This may preserve image quality while reducing motion artifacts without consuming significantly more energy.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
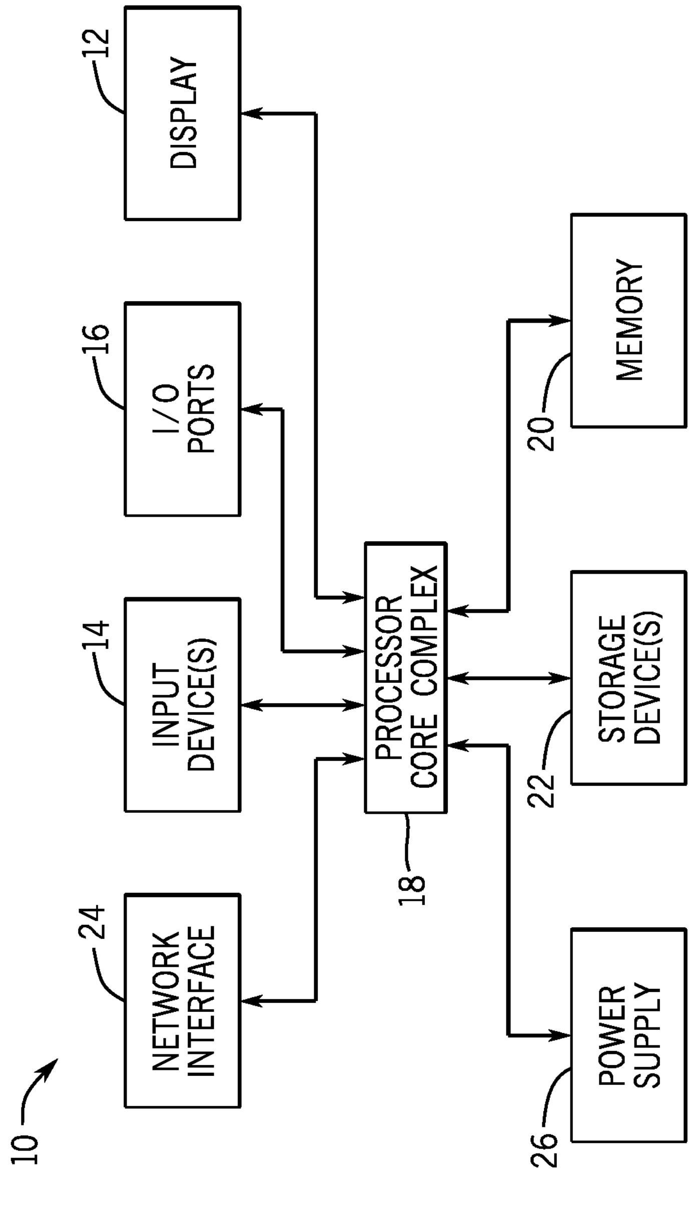
FIG. 1 is a block diagram of an electronic device with an electronic display.

An electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12.

Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

The electronic display 12 may include a display panel with an array of display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on image data associated with corresponding display pixels in the image. In some embodiments, image data may be generated by an image source, such as the processor core complex 18, a graphics processing unit (GPU), or an image sensor. Additionally, in some embodiments, image data may be received from another electronic device, for example, via the network interface 24 and/or an I/O port 16. Similarly, the electronic display 12 may display frames based on image data generated by the processor core complex 18, or the electronic display 12 may display frames based on image data received via the network interface 24, an input device, or an I/O port 16.

Figure 2:
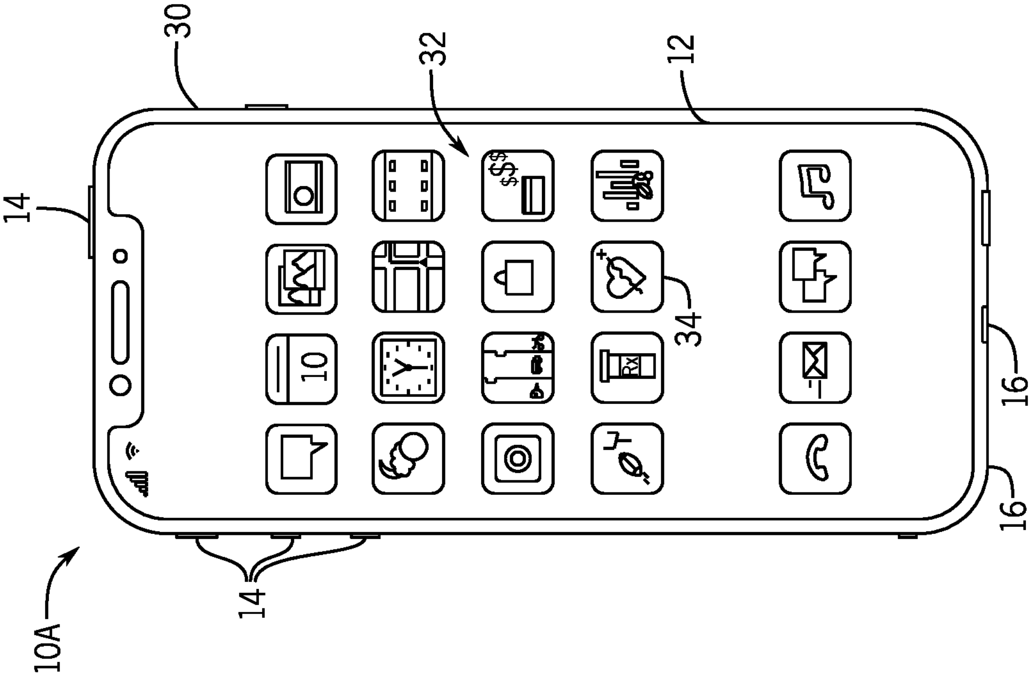
FIG. 2 is a front view of a handheld device representing an example of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
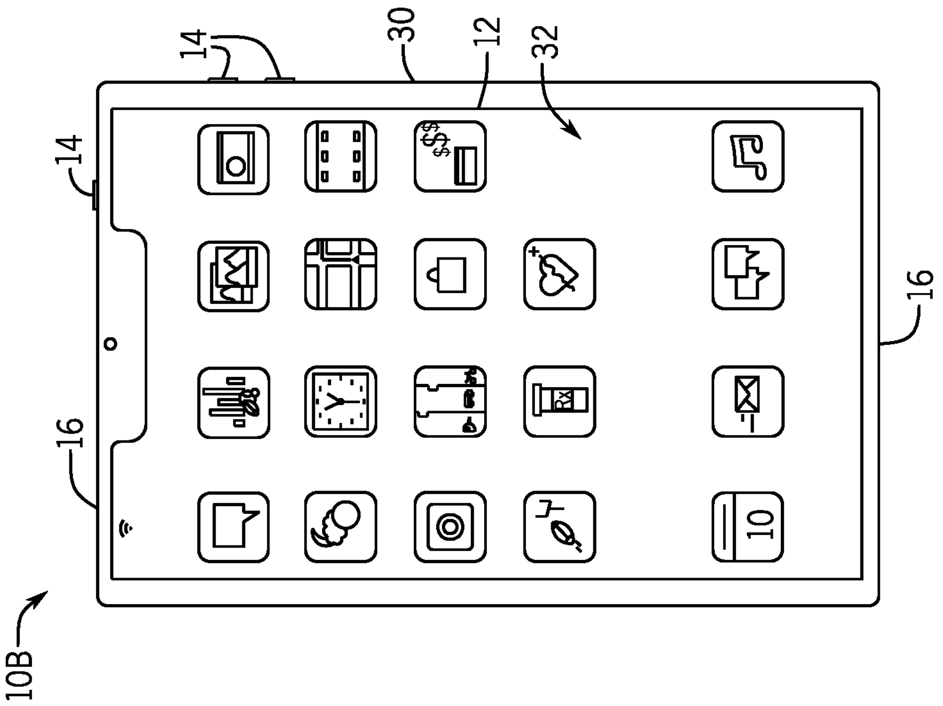
FIG. 3 is a front view of another handheld device representing another example of the electronic device of FIG. 1.
Figure 4:
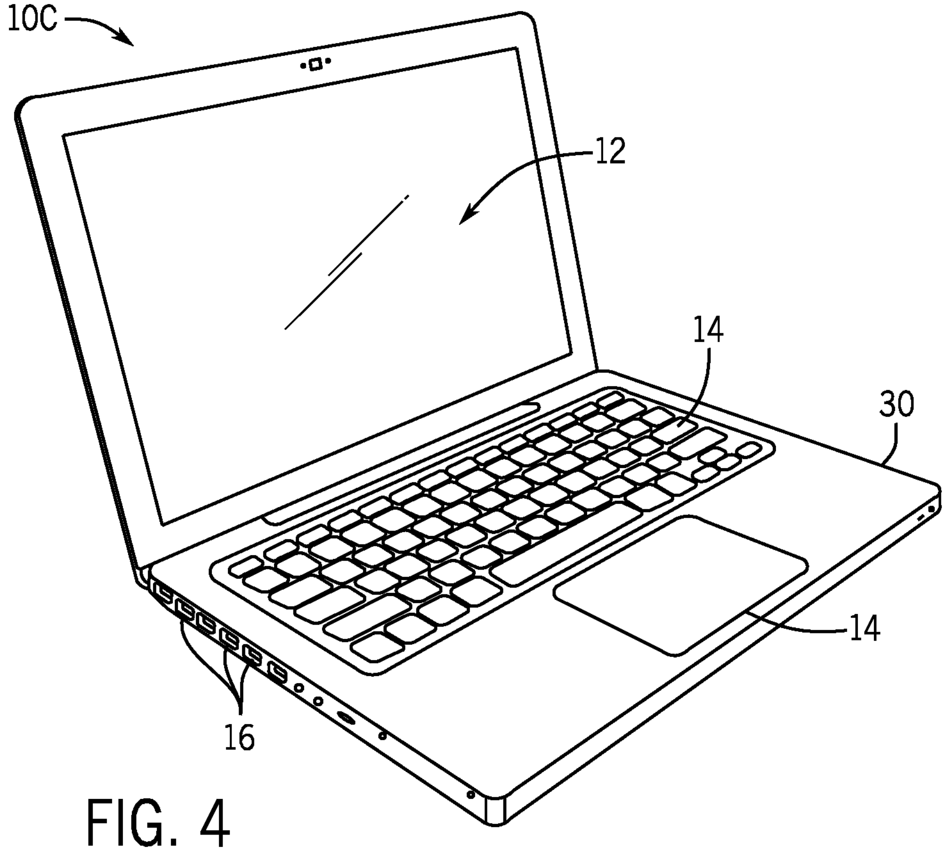
FIG. 4 is a perspective view of a notebook computer representing an example of the electronic device of FIG. 1.
Figure 5:
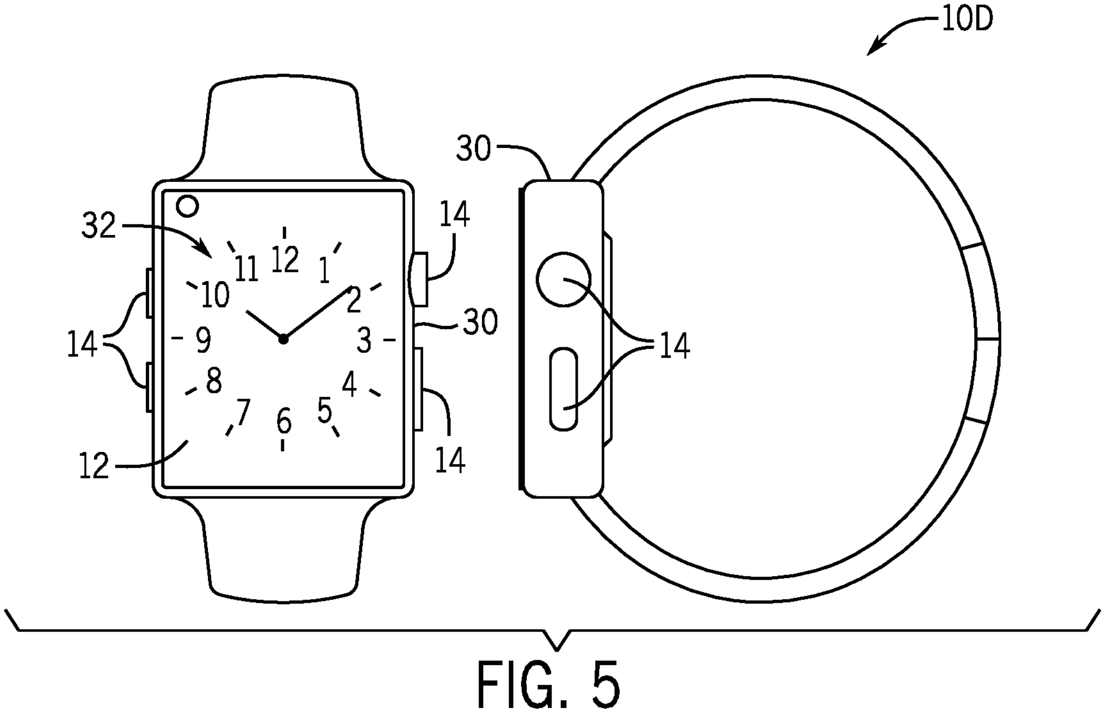
FIG. 5 illustrates front and side views of a wearable electronic device representing another example of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed with respect to FIGS. 2 and 3.

Figure 6:
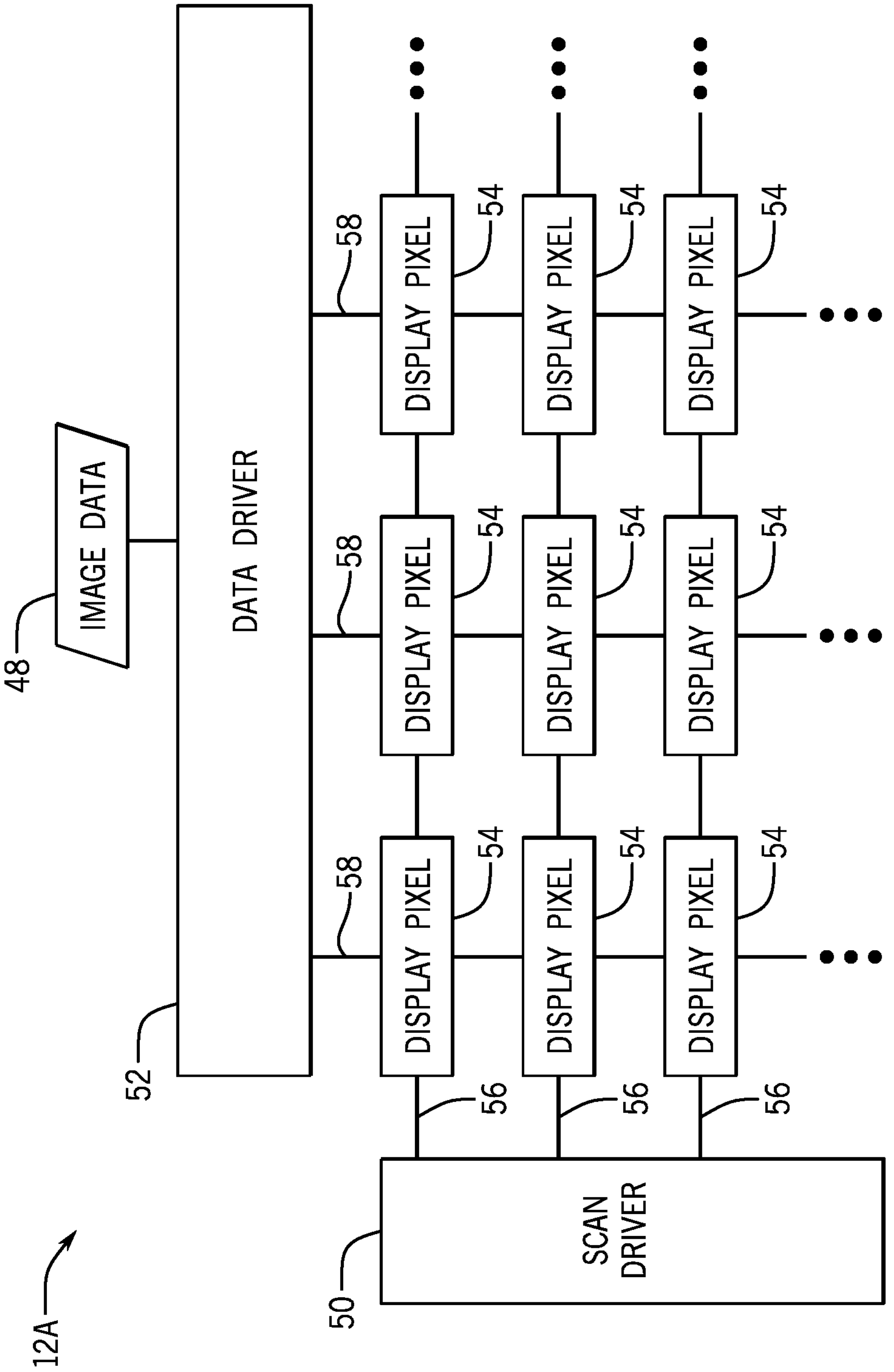
FIG. 6 is a block diagram of a first type of electronic display having an array of display pixels controlled by display driver circuitry.

FIG. 6 illustrates one version of the electronic display 12 that may use pixel grouping to increase frame rates without consuming additional power and while preserving image quality. In FIG. 6, the electronic display 12 is shown as an electronic display 12A representing a liquid crystal display (LCD) or an organic light emitting diode (OLED) display. The electronic display 12A may receive image data 48 for display. The electronic display 12A uses display driver circuitry that includes scan driver circuitry 50 and data driver circuitry 52 to program the image data 48 onto display pixels 54. The display pixels 54 may each represent a liquid crystal (LC) cell to filter certain colors of light in various brightness levels from a backlight (not shown) or may contain one or more self-emissive elements, such as a light-emitting diodes (LEDs) (e.g., organic light emitting diodes (OLEDs) or micro-LEDs (μLEDs)). The display pixels 54 may also represent pixels of digital mirror devices (DMD) or other suitable display devices that may use pixel grouping. In any event, different display pixels 54 may emit different colors (e.g., red, green, blue (RGB)). For example, some of the display pixels 54 may emit red light, some may emit green light, and some may emit blue light. Thus, the display pixels 54 may be driven to emit light at different brightness levels to cause a user viewing the electronic display 12A to perceive an image formed from different colors of light. The display pixels 54 may also correspond to hue and/or luminance levels of a color to be emitted and/or to alternative color combinations, such as combinations that use cyan, magenta, and yellow (CMY), or others.

The scan driver 50 may provide scan signals (e.g., pixel reset, data enable, on-bias stress) on scan lines 56 to control the display pixels 54 by row. For example, the scan driver 50 may cause one or more selected rows of the display pixels 54 to become enabled to receive a portion of the image data 48 from data lines 58 from the data driver 52. In this way, an image frame of image data 48 may be programmed onto the display pixels 54 row by row or selected groups of rows. As will be discussed in greater detail below, by selecting adjacent groups of rows (e.g., N, N+1) for one frame and then selecting adjacent groups of rows (e.g., N+1, N+2) for a subsequent frame, lower-resolution image data 48 (e.g., half-resolution image data) may be presented on the electronic display 12A at a higher frame rate without consuming substantially more power and while still preserving image quality.

Figure 7:
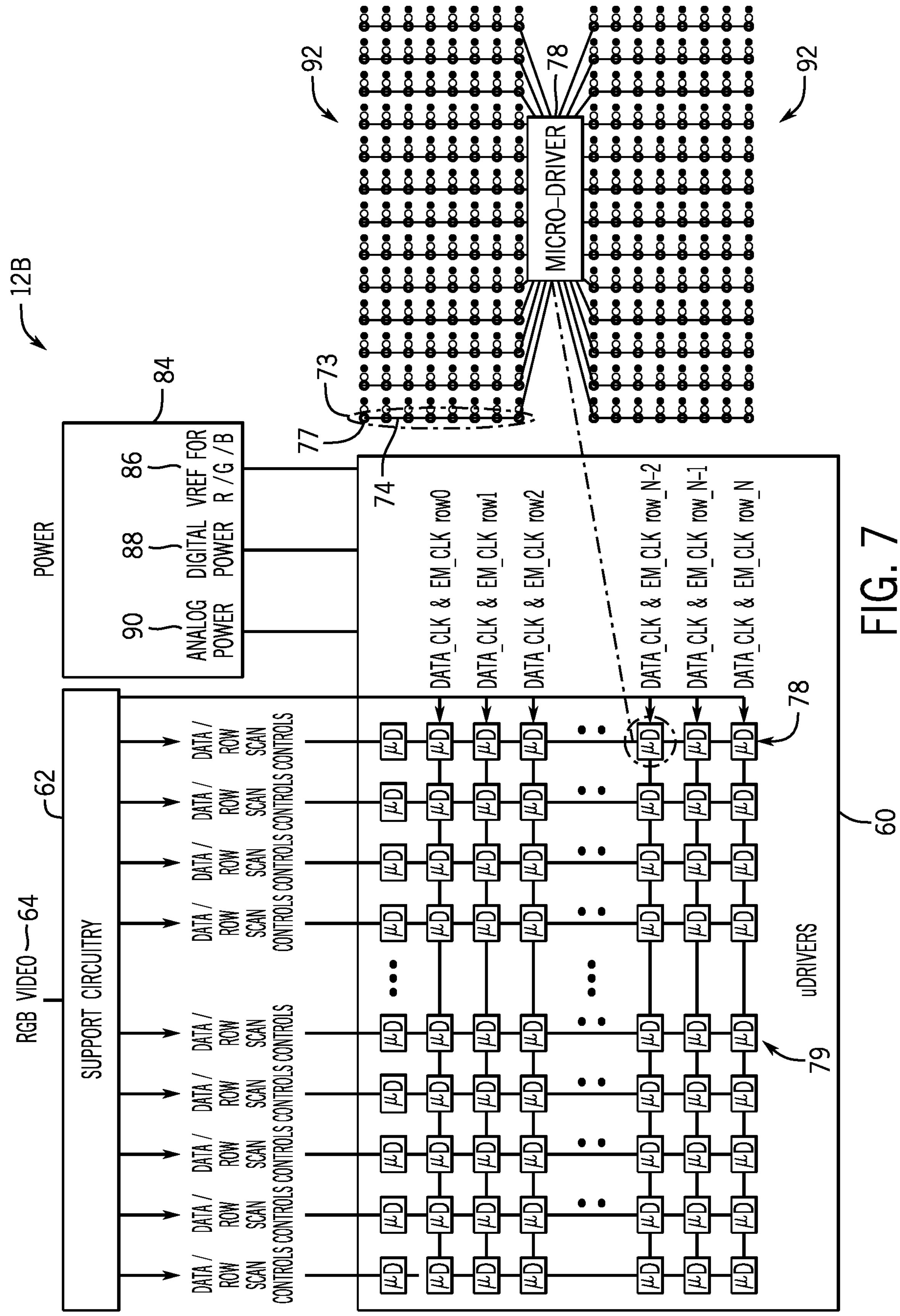
FIG. 7 is a block diagram of a second type of electronic display that employs microdrivers to drive display pixels with controls signals.

FIG. 7 depicts a block diagram of an example architecture of another example of the electronic display 12 that may use pixel grouping to increase frame rates without consuming additional power and while preserving image quality. In the example of FIG. 7, the electronic display 12 is shown as an electronic display 12B in the form of a micro-LED display. The electronic display 12B uses an RGB display panel 60 with pixels that include red, green, and blue micro-LEDs as display pixels. Support circuitry 62 may receive RGB-format video image data 64. It should be appreciated, however, that the electronic display 12B may alternatively display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or an emission clock signal (EM_CLK) to control the provision of the image data 64 in the electronic display 12B. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 includes microdrivers 78. The microdrivers 78 are arranged in an array 79. Each microdriver 78 drives a number of display pixels 77. The display pixels 77 driven by each microdriver 78 may be arranged as a local passive matrix (LPM) 92. In one example, each microdriver 78 drives two local passive matrices (LPMs) 92 of display pixels 77, one above the microdriver 78 and one below the microdriver 78. Before continuing, it should be appreciated that the array 79 thus may have LPM columns 92 that include multiple different LPMs 92 that are driven by different microdrivers 78. For each LPM 92, different display pixels 77 may include different colored micro-LEDs (e.g., a red micro-LED, a green micro-LED, or a blue micro-LED) to represent the image data 64 in RGB format. Although one of the microdrivers 78 of FIG. 7 is shown to drive a local passive matrix (LPM) 92 having twenty-six anode groups 73 having eight display pixels 77 each, each microdriver 78 may drive more or fewer anode groups 73 and respective display pixels 77. As illustrated, the subset of display pixels 77 located on each anode group 73 may be associated with a particular color (e.g., red, green, blue). As mentioned above, it should be noted that a respective cathode corresponds to a subset of display pixels 77 associated with a particular color even though each cathode for a particular color channel is not illustrated in FIG. 7. For example, anode 74 corresponds to a red color channel (e.g., subset of red display pixels 77) and there may be a corresponding shared cathode for all color channels or a separate cathode corresponding to the red color channel. There are a second set of anodes that couple to a green color channel (e.g., subset of green display pixels 77) and a third set of anodes that couple to a blue color channel (subset of blue display pixels 77), but these are not expressly illustrated in FIG. 7 for ease of description. Each microdriver 78 may drive some number of selected row(s) of display pixels 77 of each LPM at a time.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

Figure 8:
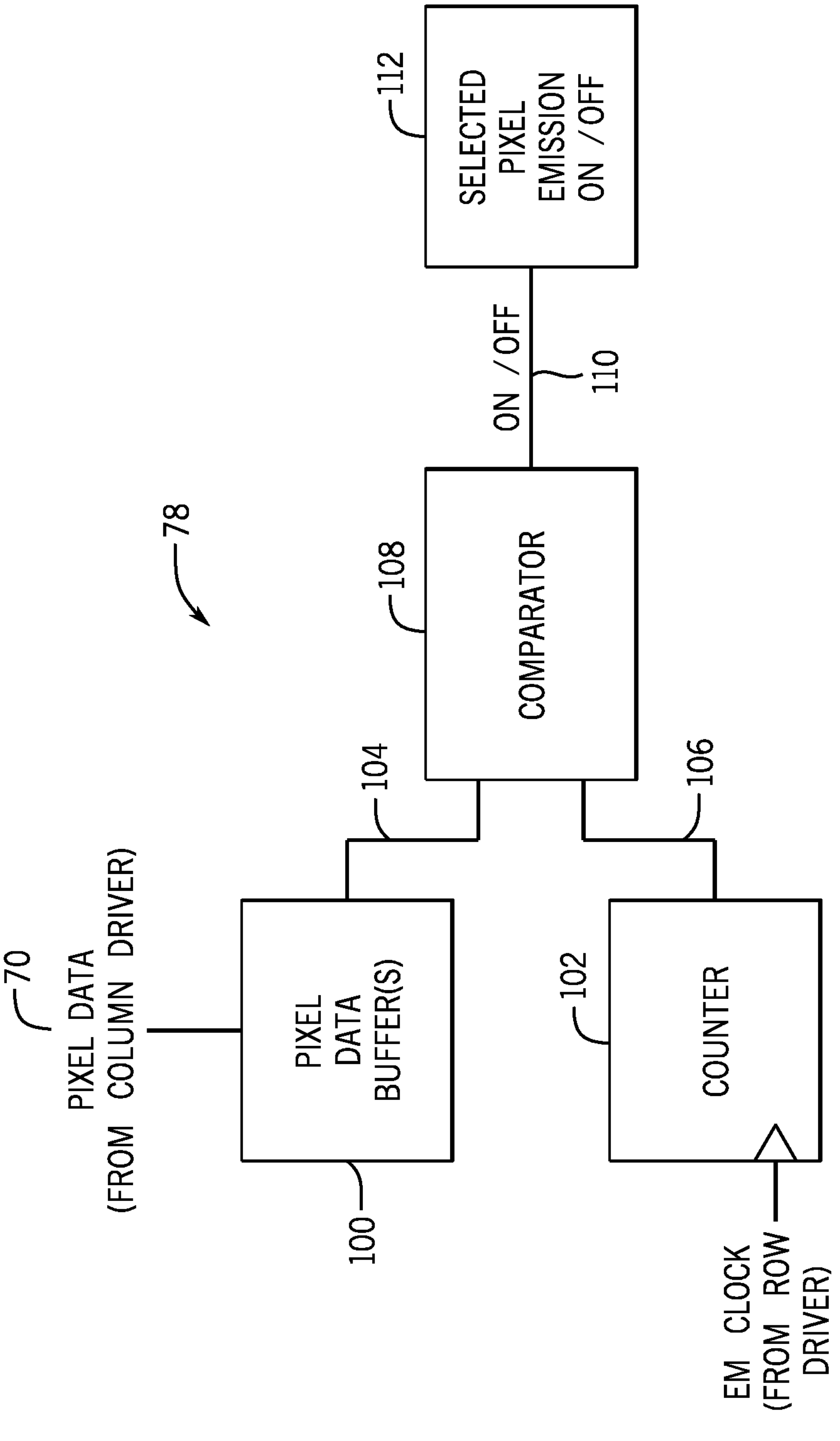
FIG. 8 is a block diagram schematically illustrating an operation of a microdriver of FIG. 7.

A block diagram shown in FIG. 8 illustrates some of the components of one of the microdrivers 78 used to drive one display pixel 77. The microdriver 78 shown in FIG. 6 includes pixel data buffer(s) 100 and a digital counter 102. The pixel data buffer(s) 100 may include sufficient storage to hold the image data 70 that is provided. For instance, the microdriver 78 may include pixel data buffers to store image data 70 for a display pixel 77 at any one time (e.g., for one RGB pixel group of 8-bit image data 70, this may be 24 bits of storage). It should be appreciated, however, that the microdriver 78 may include more or fewer buffers, depending on the data rate of the image data 70, the number of display pixels 77 to be driven by the image data 70, and the number of pixels 77 in selected row(s) of one of the local passive matrices (LPMs) 92 driven by the microdriver 78. The pixel data buffer(s) 100 may take any suitable logical structure based on the order that a column driver of the support circuitry 62 provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the microdriver 78 may provide the emission clock signal (EM_CLK). A counter 102 may receive the emission clock signal (EM_CLK) as an input. The pixel data buffer(s) 100 may output enough of the stored image data 70 to output a digital data signal 104 represent a desired gray level for a particular display pixel 77 that is to be driven by the microdriver 78. The counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
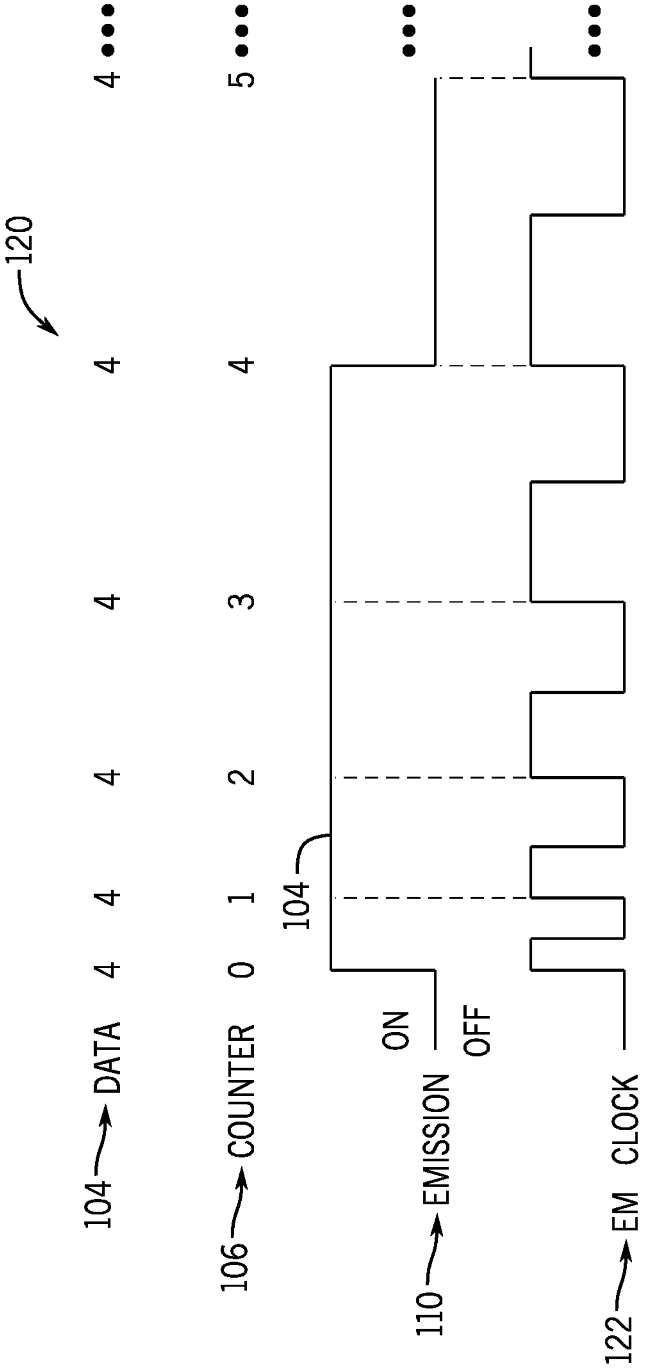
FIG. 9 is a timing diagram illustrating an example operation of the microdriver of FIG. 8.

A timing diagram 120, shown in FIG. 9, provides one brief example of the operation of the microdriver 78. The timing diagram 120 shows the digital data signal 104, the digital counter signal 106, the emission control signal 110, and the emission clock signal (EM_CLK) represented by numeral 122. In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the value of the data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 10:
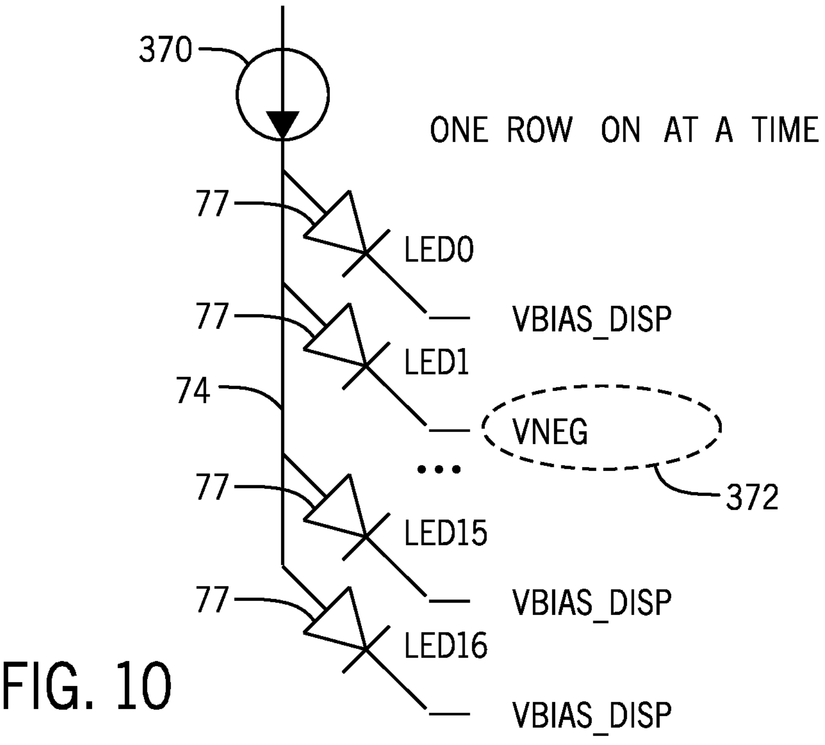
FIG. 10 illustrates circuitry that may be used by the electronic display of FIG. 7 to drive a single row of display pixels for full-resolution image data.
Figure 11:
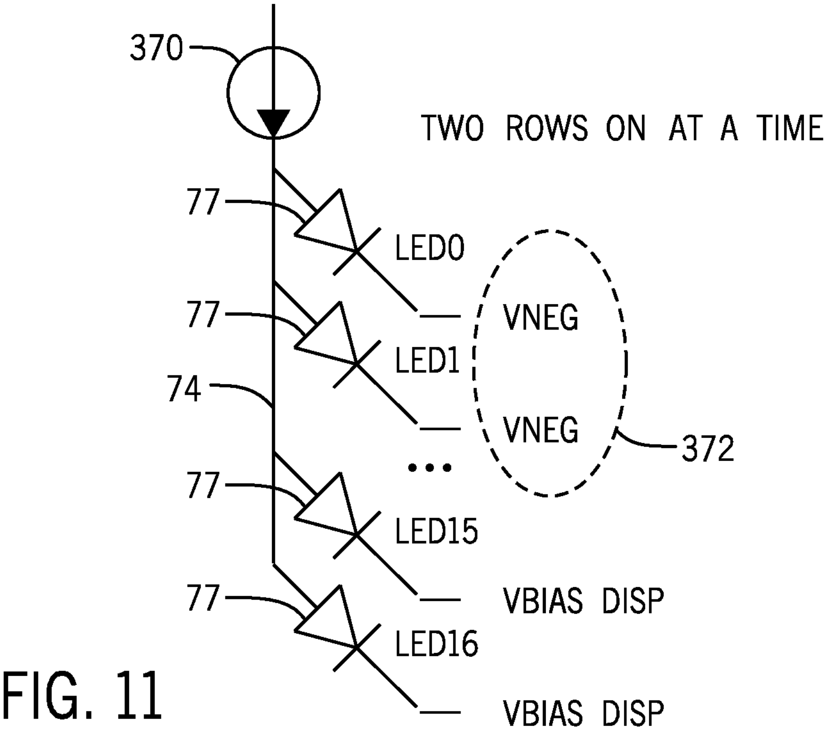
FIG. 11 illustrates circuitry that may be used by the electronic display of FIG. 7 to drive two rows of display pixels for half-resolution image data.

The architecture of the LPMs 92 of the electronic display 12B allows for multiplexing of image data by programming the same image data into multiple pixels of different rows at once. Thus, each row of display pixels 77 may be driven one row at a time or multiple rows at a time. FIG. 10 illustrates driving a column of display pixels 77 of an electronic display 12B one at a time. Driving circuitry 370 may provide a driving signal on an anode 74 that is shared by multiple display pixels 77. By coupling a low voltage (VNEG) 372 to a cathode of a selected display pixel 77, here shown as LED1, the selected display pixel 77 may be made to emit light. Cathodes of unselected display pixels 77 may be coupled to a higher voltage. The low voltage (VNEG) 372 may be any suitable voltage low enough to cause a voltage difference across the μLED of the selected row of display pixels 77 that exceeds a diode threshold voltage. The higher voltage (VBIAS_DISP) may be any suitable voltage high enough to cause the voltage difference across the μLEDs of the unselected display pixels 77 not to exceed the diode threshold voltage. In some implementations (e.g., as shown in FIG. 7), a cathode corresponding to a row of multiple columns of display pixels 77 may be coupled to the low voltage (VNEG) 372. The electronic display 12B may also be made to select multiple rows at once, enabling pixel grouping in accordance with this disclosure, as shown in FIG. 11. This may be accomplished by coupling the cathodes of multiple rows to the low voltage (VNEG) 372, here shown as LED0 and LED1.

Figure 12:
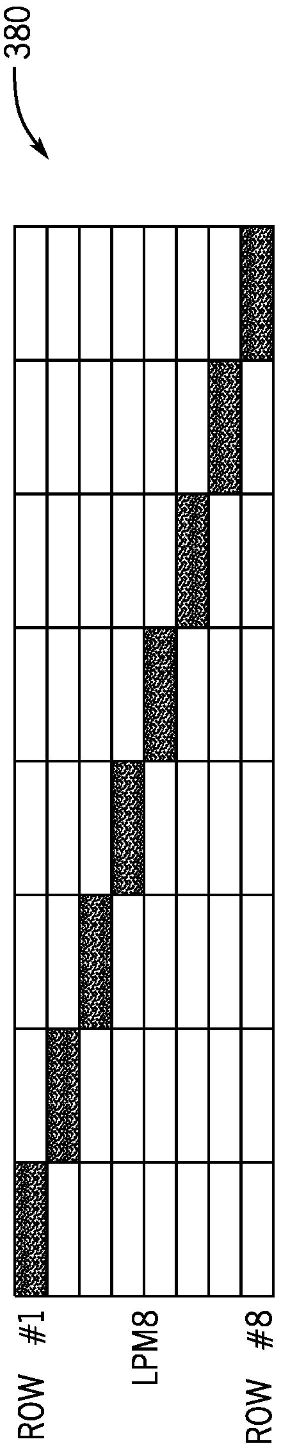
FIG. 12 is an example timing diagram for programming rows of the electronic display of FIG. 7 for full-resolution image data on an 8-row local passive matrix.
Figure 13:
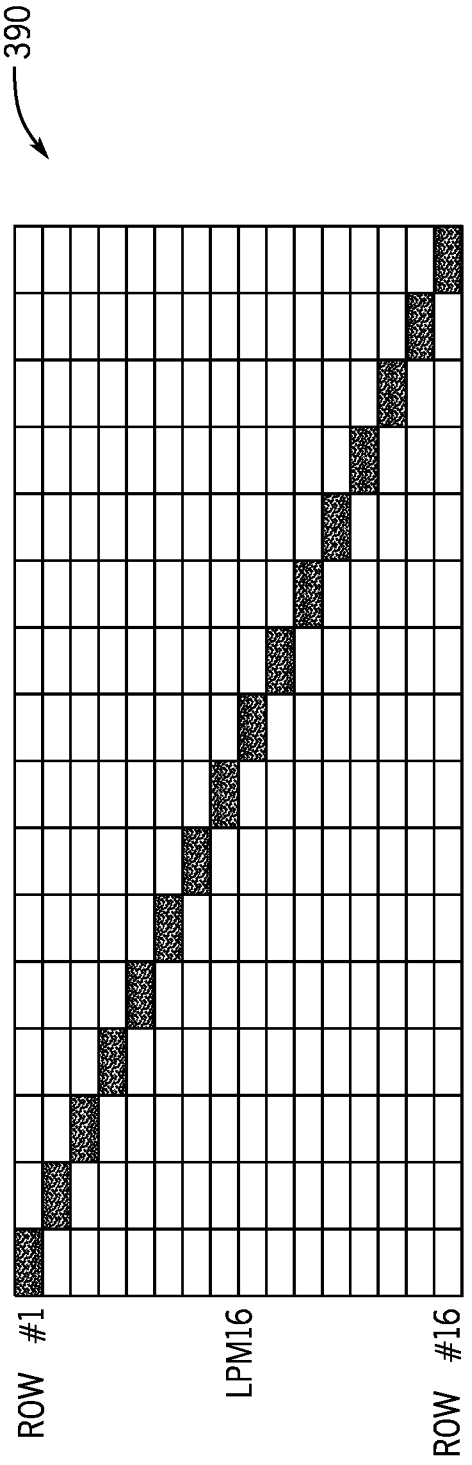
FIG. 13 is an example timing diagram for programming rows of the electronic display of FIG. 7 for full-resolution image data on a 16-row local passive matrix.

Individual local passive matrices (LPMs) 92 may have rows that are driven according to the selection shown in FIGS. 10 and 11. Timing diagrams 380 of FIG. 12 and 390 of FIG. 13 illustrate an electronic display 12B driving different-sized LPMs 92 with full-resolution image data at a base frame rate frequency. In FIG. 12, the timing diagram 380 shows the timing of light emission by row (ordinate) of an LPM 92 with 8 rows over time (abscissa). In FIG. 13, the timing diagram 390 shows the timing of light emission by row (ordinate) of an LPM 92 with 16 rows over time (abscissa). The timing diagrams 380 and 390 show that, for full-resolution image data at a base frame rate frequency, rows of pixels may emit light sequentially over the period of time of the base frame rate frequency.

Figure 14:
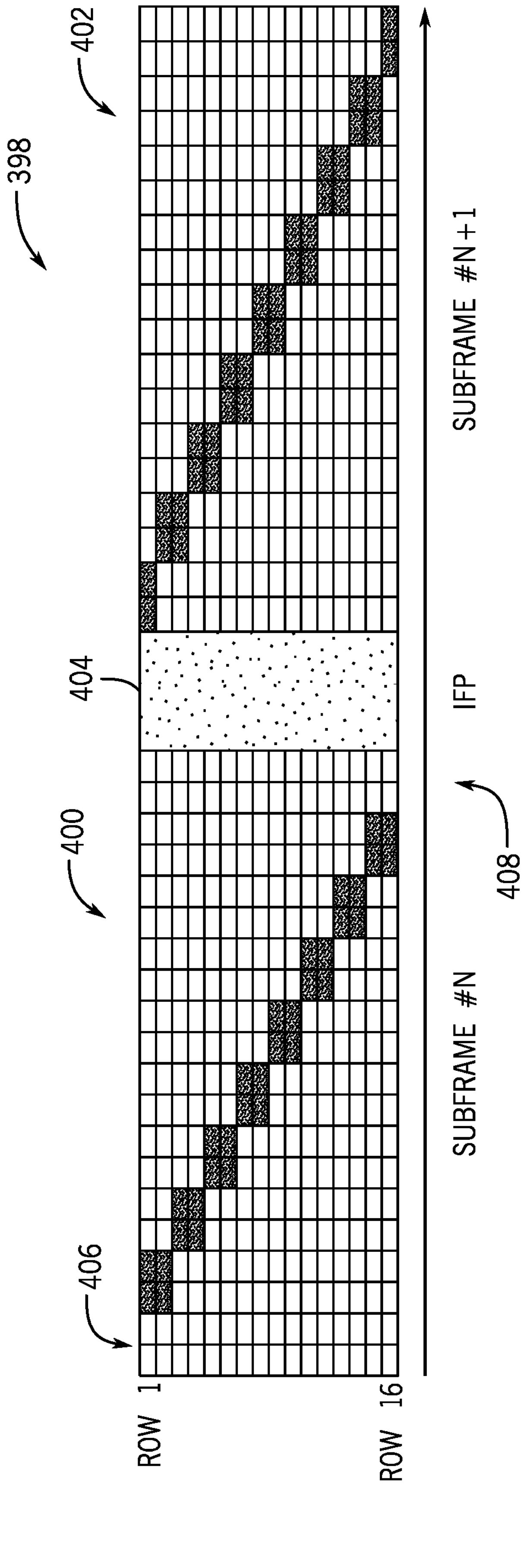
FIG. 14 is an example timing diagram for programming rows of the electronic display of FIG. 7 for half-resolution image data on a 16-row local passive matrix.

The electronic display 12B may use pixel grouping to display lower-resolution image data at a higher frame rate. For example, FIG. 14 illustrates a timing diagram 398 for driving an LPM 92 using half-resolution image data at a frame rate double that of the base frame frequency of FIG. 12 or 13. In FIG. 14, the timing diagram 398 shows the timing of light emission by row (ordinate) of an LPM 92 with 16 rows over time (abscissa). The timing diagram 398 is divided into a first subframe 400 (e.g., subframe N) and a second subframe 402 (e.g., subframe N+1) separated by an intraframe pause 404 during which no pixels emit light. In some embodiments, the first subframe 400 and the second subframe 402 may represent separate frames of half-resolution image data that have been prepared individually by, for example, the processor core complex or image processing circuitry of a display pipeline. In other embodiments, the microdrivers 78 may receive a frame of full-resolution image data and calculate the half-resolution image data for each subframe based on the frame of full-resolution image data, which may enable subframes of very high frequencies (e.g., faster than processing circuitry of the electronic device might be able to generate new frames of image data). In another example, two or more subframes may be received by the microdrivers 78 and stored, then displayed alternatingly on multiple rows over a series of subframes in a form of subframe dithering. In this way, even though the subframes may occur at frequencies higher than system rendering loading, emission row timing may still be increased without sacrificing image quality.

In the first subframe 400 of FIG. 14, groups of two rows of pixels (N and N+1; 1 and 2, 3 and 4, 5 and 6, and so forth) are illuminated sequentially. The amount of light emitted by each individual display pixel of the row will vary but will not be longer than the total time illustrated in the timing diagram 398. In the second subframe 402, different groups of two rows of pixels (N+1 and N+2; 2 and 3, 4 and 5, 6 and 7, and so forth) are illuminated sequentially. The first row and the last row may be illuminated individually using image data also provided to adjacent rows of adjacent LPMs (not shown) driven by different respective microdrivers. For example, the image data provided to the first row in the second subframe 402 may also be provided to a bottom row of an adjacent LPM disposed above. To account for the additional time consumed by the second subframe 402 to drive the first row and the last row individually, the first subframe 400 may include emission pauses 406 and 408. Thus, the electronic display 12B as well as the electronic display 12A may use pixel grouping to display higher-frame rate image data at lower resolutions while preserving image quality.

Whether in the form of the electronic display 12A or the electronic display 12B, operating at a higher frame rate in some situations may improve the user experience. This disclosure describes various systems and methods to control an electronic display 12, such as the electronic display 12A or the electronic display 12B, to operate at a higher frame rate while preserving image quality and saving power. Since the electronic displays 12A and 12B may both use pixel grouping with lower-resolution image data at higher frame rates, references in this disclosure to the electronic display 12 may apply to any suitable electronic device that may perform pixel grouping, including either or both the electronic display 12A and the electronic display 12B. The disclosure may specifically note when a particular aspect of the disclosure corresponds only to the electronic display 12A or only to the electronic display 12B.

Figure 15:
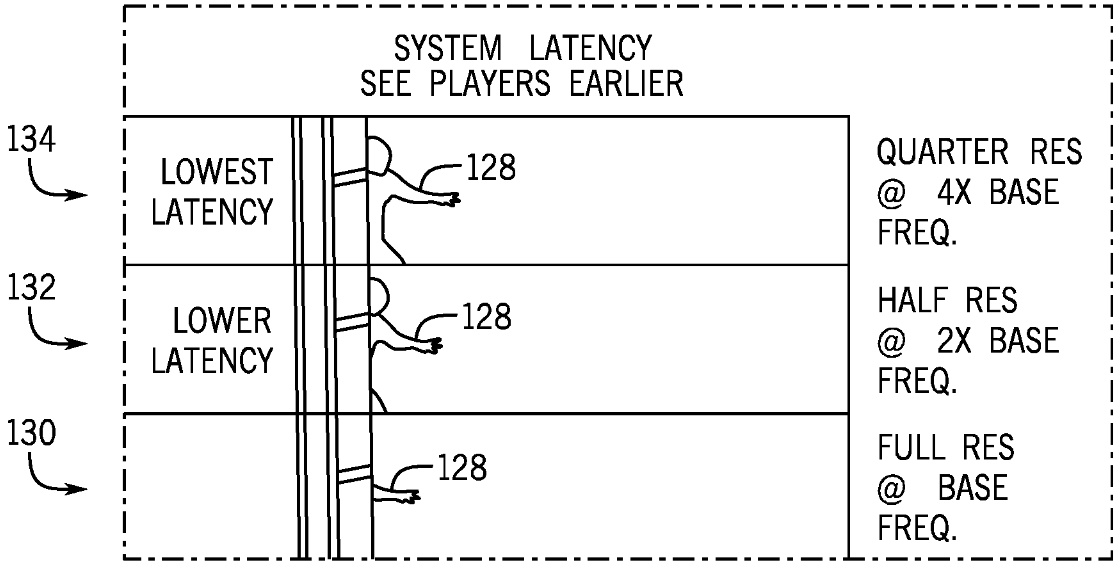
FIG. 15 illustrates a relationship between image latency and frame rate on an electronic display.

There are numerous reasons that a higher frame rate may provide an enhanced user experience. Among other things, a higher frame rate may reduce motion blur in video content or provide reduced visual latency in video content or games. As shown in FIG. 15, reduced system latency may be particularly noticeable in certain gaming experiences. For example, a gaming opponent 128 may become apparent more slowly when displayed at a lower frame rate 130 (e.g., 60 Hz) than a medium frame rate 132 (e.g., 120 Hz) or a higher frame rate 134 (e.g., 240 Hz). Even though the frame rates may be substantially different, operating at the higher frame rate may not consume substantially more power. This is because the medium frame rate 132 may use half-resolution image frames and the higher frame rate 134 may use quarter-resolution image frames. Even so, image quality may be substantially preserved using pixel grouping on the electronic display 12.

Figure 16:
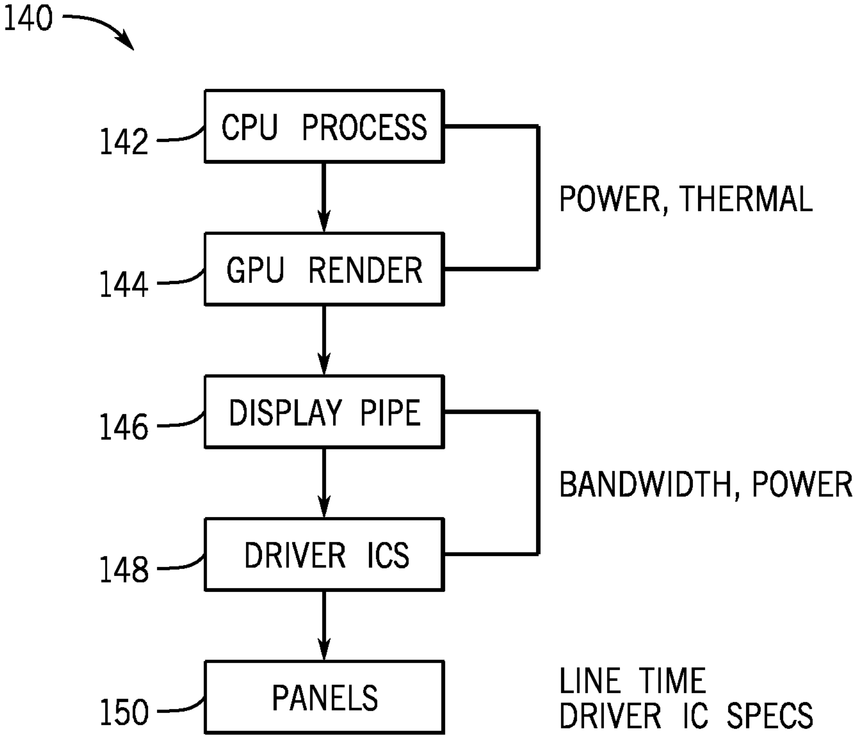
FIG. 16 is a block diagram of a pipeline of circuitry used to generate and display image data on an electronic display.

FIG. 16 illustrates a flow diagram 140 to generate higher frame rate image data at certain times (e.g., gaming, when image content has movement of a certain rate) while preserving image quality and saving power. To offset the effects of operating at a higher frame rate, lower resolutions may be used. At lower resolutions (e.g., half- or quarter-resolution), CPU processing 142 (e.g., in the processor core complex 18 shown in FIG. 1) and GPU rendering 144 (e.g., in the processor core complex 18) may be less demanding than full resolution, reducing power and thermal constraints. This may allow the CPU processing 142 and GPU rendering 144 to rapidly generate source image data without excessive power consumption or heat. Display pipeline processing 146 may similarly use less power or bandwidth when preparing the source image data for display on the electronic display 12. That is, the display pipeline processing 146 may involve operating at higher frequencies for higher frame rates, but because the bandwidth and power consumption is lower on a per-frame basis, the display pipeline processing 146 may operate at a higher frame rate without significant constraints due to bandwidth and power consumption that would arise using full-resolution image data. The CPU processing 142, GPU rendering 144, or display pipeline processing 146 may include generating or providing instructions to the electronic display to display higher-frame-rate, lower resolution image data in groups of rows at a particular frame rate. Reductions in power and bandwidth on a per-frame basis also reduce constraints during driver IC operation 148 (e.g., for the driving circuitry 50 and 52 shown in FIG. 6 or the micro-drivers 78 shown in FIG. 7). Likewise, at lower resolutions, pixel grouping may allow for panel display timing 150 to have faster line times and other driver specifications on a per-frame basis. Thus, the panel display timing 150 may accommodate a higher frame rate at lower resolutions without a significant burden.

Figure 17:
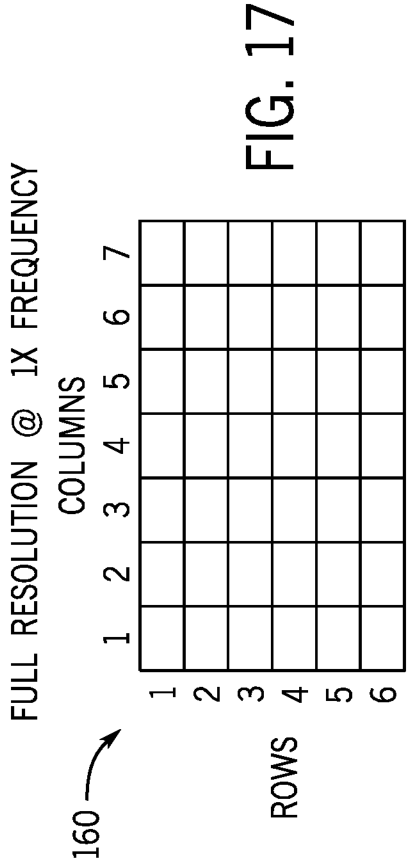
FIG. 17 is a block diagram of a full-resolution image frame generated at a first frame rate.
Figure 18:
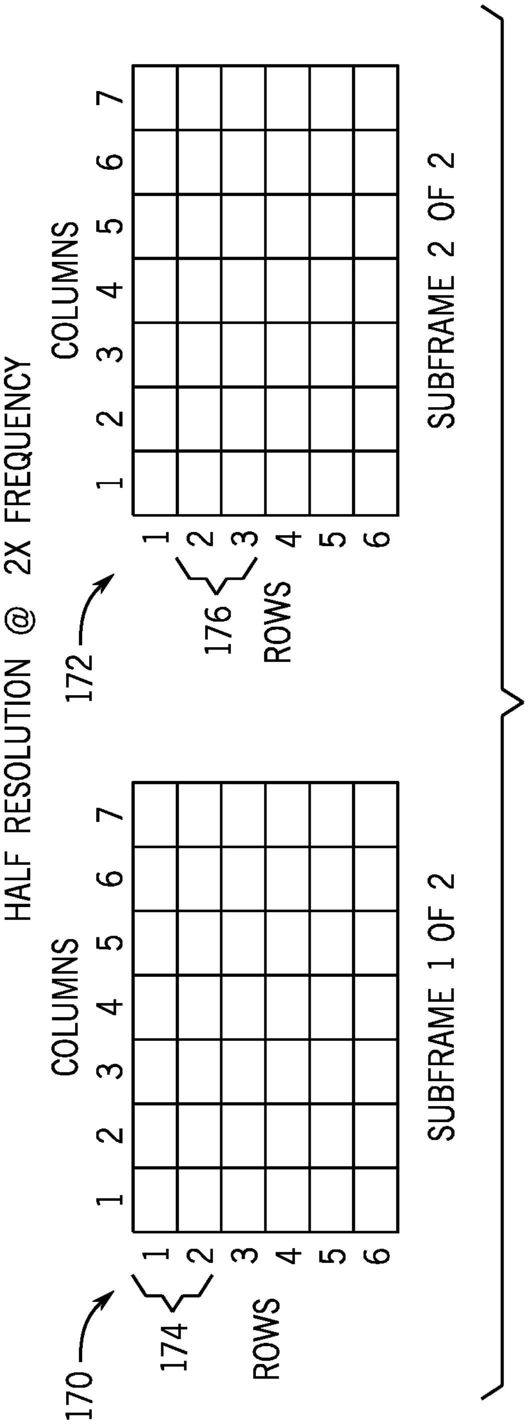
FIG. 18 is a block diagram of two half-resolution image frames generated at double the first frame rate and displayed with a pixel grouping pattern to preserve image quality while saving power.
Figure 19:
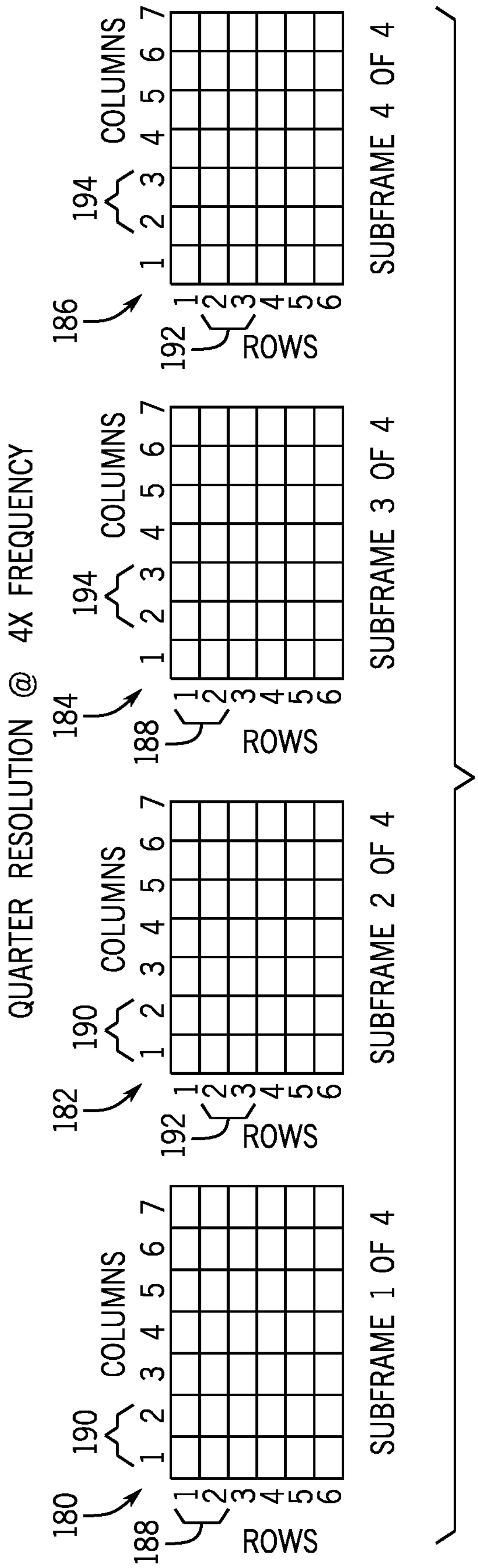
FIG. 19 is a block diagram of four quarter-resolution image frames generated at four times the first frame rate and displayed with a first pixel grouping pattern to preserve image quality while saving power.
Figure 20:
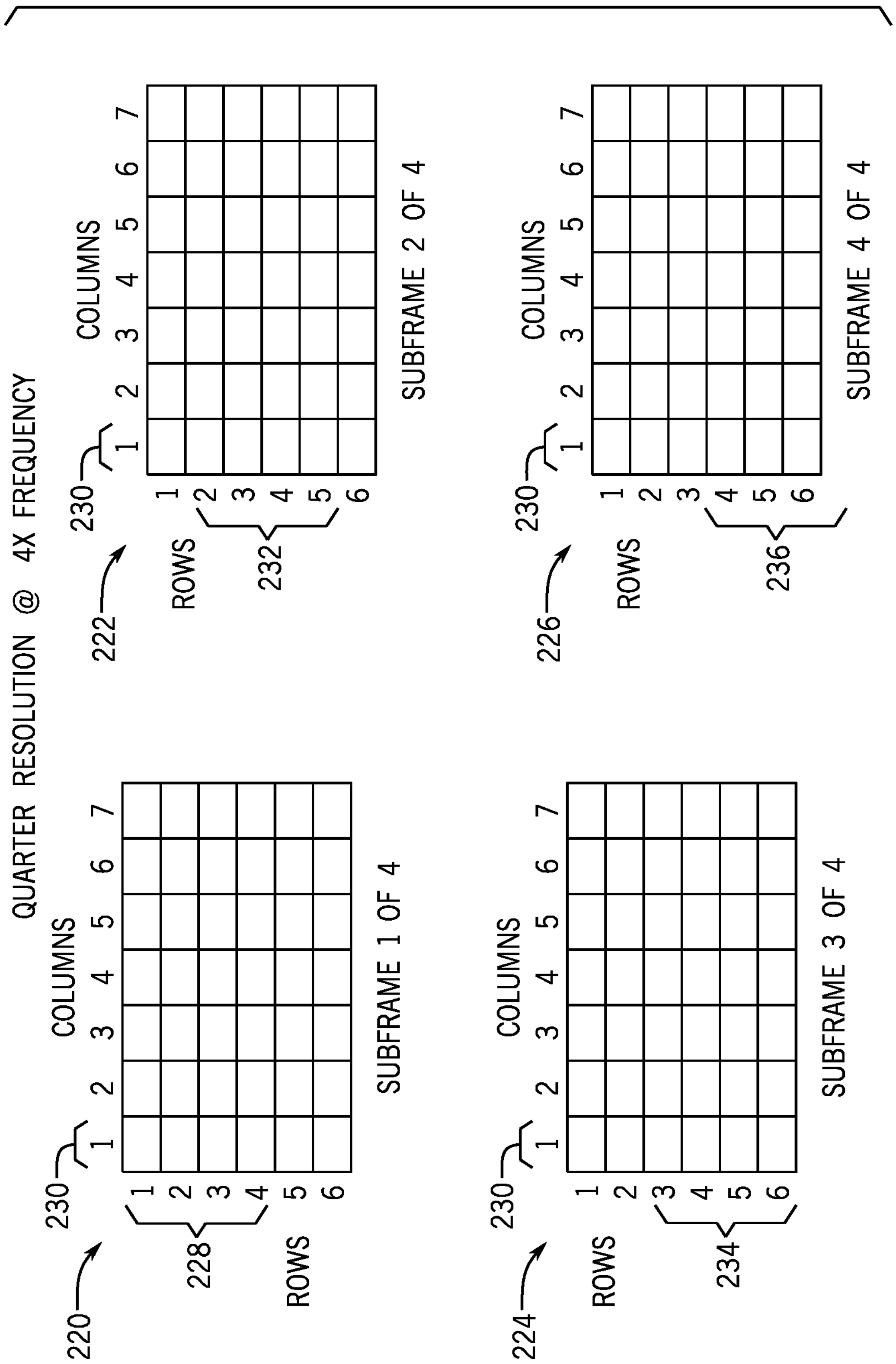
FIG. 20 is a block diagram of four quarter-resolution image frames generated at four times the first frame rate and displayed with a second pixel grouping pattern to preserve image quality while saving power.

FIGS. 17-20 illustrate examples of pixel grouping for different resolutions and frequencies. FIG. 17 illustrates a frame arrangement 160 for a frame of image data on an electronic display without pixel grouping. The frame arrangement 160 may be used at full resolution and a base frequency (e.g., 60 Hz, 120 Hz, 240 Hz). By contrast, FIGS. 18-20 illustrate frame arrangements that have integer fractional row resolution or integer fractional row resolution+1 row to enable pixel grouping at a frequency higher than the base frequency, while avoiding consuming excessive power and preserving image quality.

FIG. 18 illustrates a first frame arrangement 170 and a second frame arrangement 172 that may be used at half resolution and double the base frequency (e.g., 120 Hz, 240 Hz, 480 Hz) to achieve a higher frame rate while preserving image quality. The first frame arrangement 170 may be used for a first frame (e.g., a first of two subframes within the base frequency) and the second frame arrangement 172 may be used for a first frame (e.g., a second of two subframes within the base frequency). The first frame arrangement 170 includes a first group 174 of rows of pixels that are grouped together, here shown as rows N and N+1 (e.g., rows 1 and 2, 3 and 4, 5 and 6, and so forth). The second frame arrangement 172 includes a second group 176 of rows of pixels that are grouped together, here shown as rows N+1 and N+2 (e.g., rows 2 and 3, 4 and 5, 6 and 7, and so forth). The frame arrangements 170 and 172 include alternating groups of rows that may share the same image data from a particular column. For example, in the first frame arrangement 170, pixels at (row 1, column 1) and (row 2, column 1) may be programmed with the same first image data, pixels at (row 1, column 2) and (row 2, column 2) may be programmed with the same first image data, and so forth. This may allow the half-resolution image data to be displayed in a way that effectively dithers the half-resolution image data, thereby preserving image data while increasing the frame rate and saving power.

FIG. 19 illustrates some frame arrangements that may be used at quarter resolution and four times the base frequency (e.g., 240 Hz, 480 Hz, 960 Hz) to achieve a higher frame rate while preserving image quality. In the same period of time used to display one frame at the base frequency (e.g., FIG. 17), a first frame arrangement 180 may be used to display a first frame (e.g., a first of four subframes within the base frequency), a second frame arrangement 182 may be used to display a second frame (e.g., a second of four subframes within the base frequency), a third frame arrangement 184 may be used to display a third frame (e.g., a third of four subframes within the base frequency), and a fourth frame arrangement 186 may be used to display a fourth frame (e.g., a fourth of four subframes within the base frequency). Although the four frame arrangements 180, 182, 184, and 186 are shown to appear in a particular order, other orders may be used. Moreover, the order may repeat or the order may shuffle every four subframes.

The first frame arrangement 180 includes a first group 188 of rows of pixels that are grouped together, here shown as rows N and N+1 (e.g., rows 1 and 2, 3 and 4, 5 and 6, and so forth), and a first group 190 of columns of pixels that are grouped together, here shown as columns M and M+1 (e.g., columns 1 and 2, 3 and 4, 5 and 6, and so forth). The second frame arrangement 182 includes a second group 192 of rows of pixels that are grouped together, here shown as rows N+1 and N+2 (e.g., rows 2 and 3, 4 and 5, 6 and 7, and so forth), and includes the first group 190 of columns of pixels that are grouped together. The third frame arrangement 184 includes the first group 188 of rows of pixels and a second group 194 of columns of pixels that are grouped together, here shown as columns M+1 and M+2 (e.g., columns 2 and 3, 4 and 5, 6 and 7, and so forth). The fourth frame arrangement 186 includes the second group 192 of rows of pixels and the second group 194 of columns of pixels. The frame arrangements 180, 182, 184, and 186 include alternating groups of rows and columns that may share the same image data. For example, in the frame arrangement 180, pixels (row 1, column 1), (row 1, column 2), (row 2, column 1), and (row 2, column 2) may be programmed with the same first image data and pixels (row 1, column 4), (row 1, column 5), (row 2, column 4), and (row 2, column 5) may be programmed with the same second image data, and so forth. This may allow the quarter-resolution image data to be displayed in a way that effectively dithers the quarter-resolution image data, thereby preserving image data while increasing the frame rate and saving power.

FIG. 20 illustrates other frame arrangements that may be used at quarter resolution and four times the base frequency (e.g., 240 Hz, 480 Hz, 960 Hz) to achieve a higher frame rate while preserving image quality. In the same period of time used to display one frame at the base frequency (e.g., FIG. 17), a first frame arrangement 220 may be used to display a first frame (e.g., a first of four subframes within the base frequency), a second frame arrangement 222 may be used to display a second frame (e.g., a second of four subframes within the base frequency), a third frame arrangement 224 may be used to display a third frame (e.g., a third of four subframes within the base frequency), and a fourth frame arrangement 226 may be used to display a fourth frame (e.g., a fourth of four subframes within the base frequency). Although the four frame arrangements 220, 222, 224, and 226 are shown to appear in a particular order, other orders may be used (e.g., 220, 224, 222, 226). Moreover, the order may repeat or the order may shuffle every four subframes.

The first frame arrangement 220 includes a first group 228 of rows of pixels that are grouped together per column (e.g., column 230), with the groups of rows shown as rows N, N+1, N+2, and N+3 (e.g., rows 1, 2, 3, and 4, rows 5, 6, 7, and 8, and so forth). The second frame arrangement 222 includes a second group 232 of rows of pixels that are grouped together, here shown as rows N+1, N+2, N+3, and N+4 (e.g., rows 2, 3, 4, and 5, and rows 6, 7, 8, and 9, and so forth). The third frame arrangement 224 includes a third group 234 of rows of pixels that are grouped together, here shown as rows N+2, N+3, N+4, and N+5 (e.g., rows 3, 4, 5, and 6, and rows 7, 8, 9, and 10, and so forth). The fourth frame arrangement 226 includes a fourth group 236 of rows of pixels that are grouped together, here shown as rows N+3, N+4, N+5, and N+6 (e.g., rows 4, 5, 6, and 7, and rows 8, 9, 10, and 11, and so forth). The frame arrangements 220, 222, 224, and 226 include shifting groups of rows that may share the same image data. For example, in the frame arrangement 220, pixels (row 1, column 1), (row 2, column 1), (row 3, column 1), and (row 4, column 1) may be programmed with the same first image data and pixels (row 1, column 2), (row 2, column 2), (row 3, column 2), and (row 4, column 2) may be programmed with the same second image data, and so forth. This may allow the quarter-resolution image data to be displayed in a way that effectively dithers the quarter-resolution image data, thereby preserving image data while increasing the frame rate and saving power.

Figure 21:
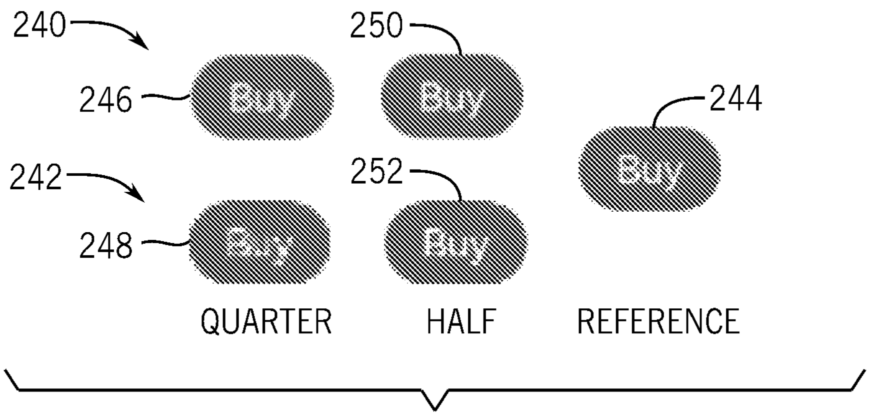
FIG. 21 shows examples of half-resolution and quarter-resolution images, with and without pixel grouping, compared to a full-resolution reference image.

While FIGS. 18-20 represent a variety of frame arrangements for pixel grouping at lower resolutions and higher frame rates, any suitable frame arrangements that vary the pixel groupings frame-by-frame (e.g., subframe-by-subframe with respect to a base frequency) may be used. In any case, pixel grouping may preserve much of the image quality despite using lower-resolution image frames. An example appears in FIG. 21, which illustrates the appearance of the same image to the human eye when using pixel grouping 240 and without using pixel grouping 242, based on a reference image 244. Images 246 and 248 are quarter-resolution versions of the reference image 244. Images 250 and 252 are half-resolution images of the reference image 244. The images 246 and 250 use pixel grouping (e.g., as discussed above with reference to FIGS. 18-20), whereas the images 248 and 252 do not. As apparent in FIG. 21, varying the pixel grouping with lower-resolution image data from frame to frame may significantly preserve image quality.

Figure 22:
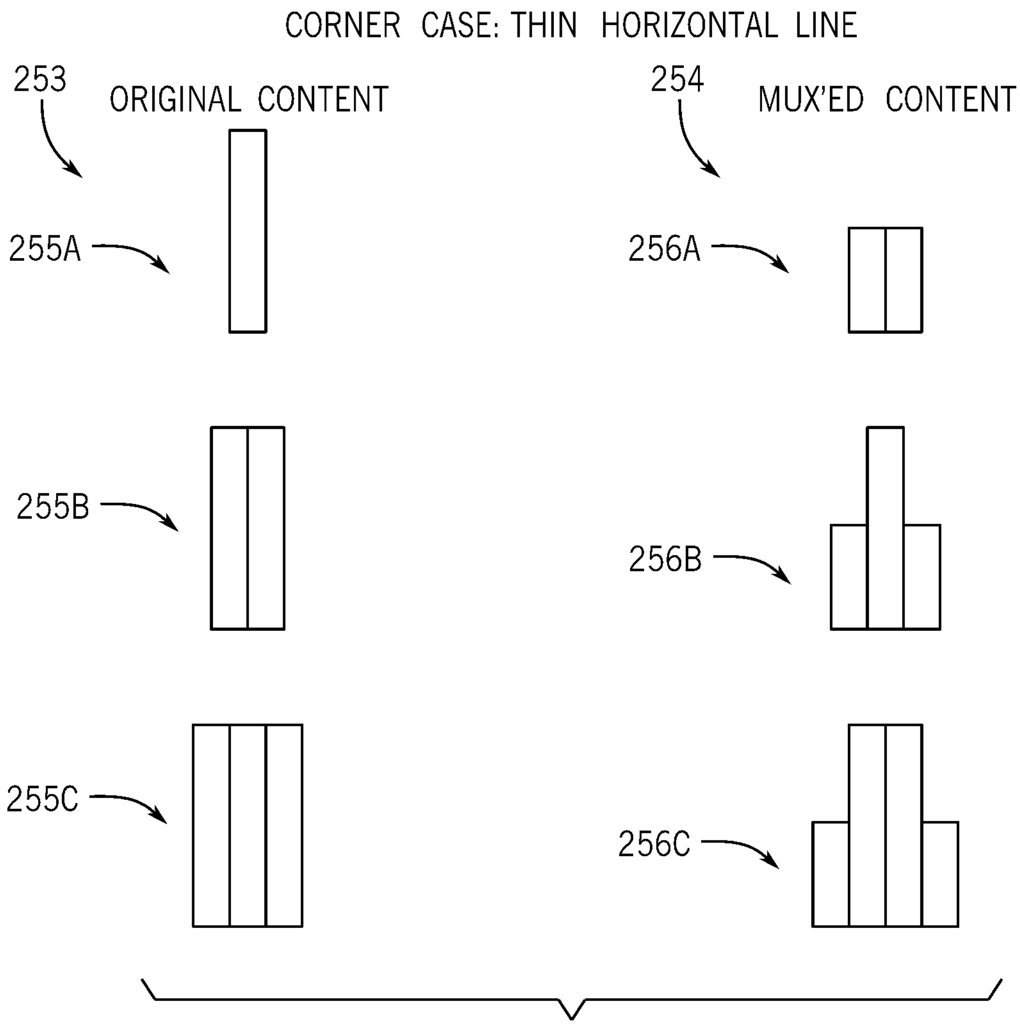
FIG. 22 shows an example of pixel grouping that may be used when the image content of the image data includes a thin horizontal line.

Even in certain corner cases, the total brightness of features of image content may be preserved using pixel grouping at lower resolutions. FIG. 22 illustrates an example of a thin horizontal line as original full resolution content 253 and half-resolution multiplexed content 254 (e.g., grouped by row as in FIG. 18). Original full-resolution content 255A that represents a single line (e.g., a single row) of a first brightness in one frame of full-resolution content may be distributed to two lines of half of the first brightness over two frames of half-resolution multiplexed content 256A. Similarly, original full-resolution content 255B that represents two lines (e.g., two adjacent rows) of content at a first brightness may be distributed to three lines over two frames of half-resolution multiplexed content 256B. Likewise, original full-resolution content 255C that represents three lines (e.g., three adjacent rows) of content at a first brightness may be distributed to four lines in two frames of half-resolution multiplexed content 256C. In all cases, the multiplexed content 254 may preserve the total brightness of the original full-resolution content 253.

Figure 23:
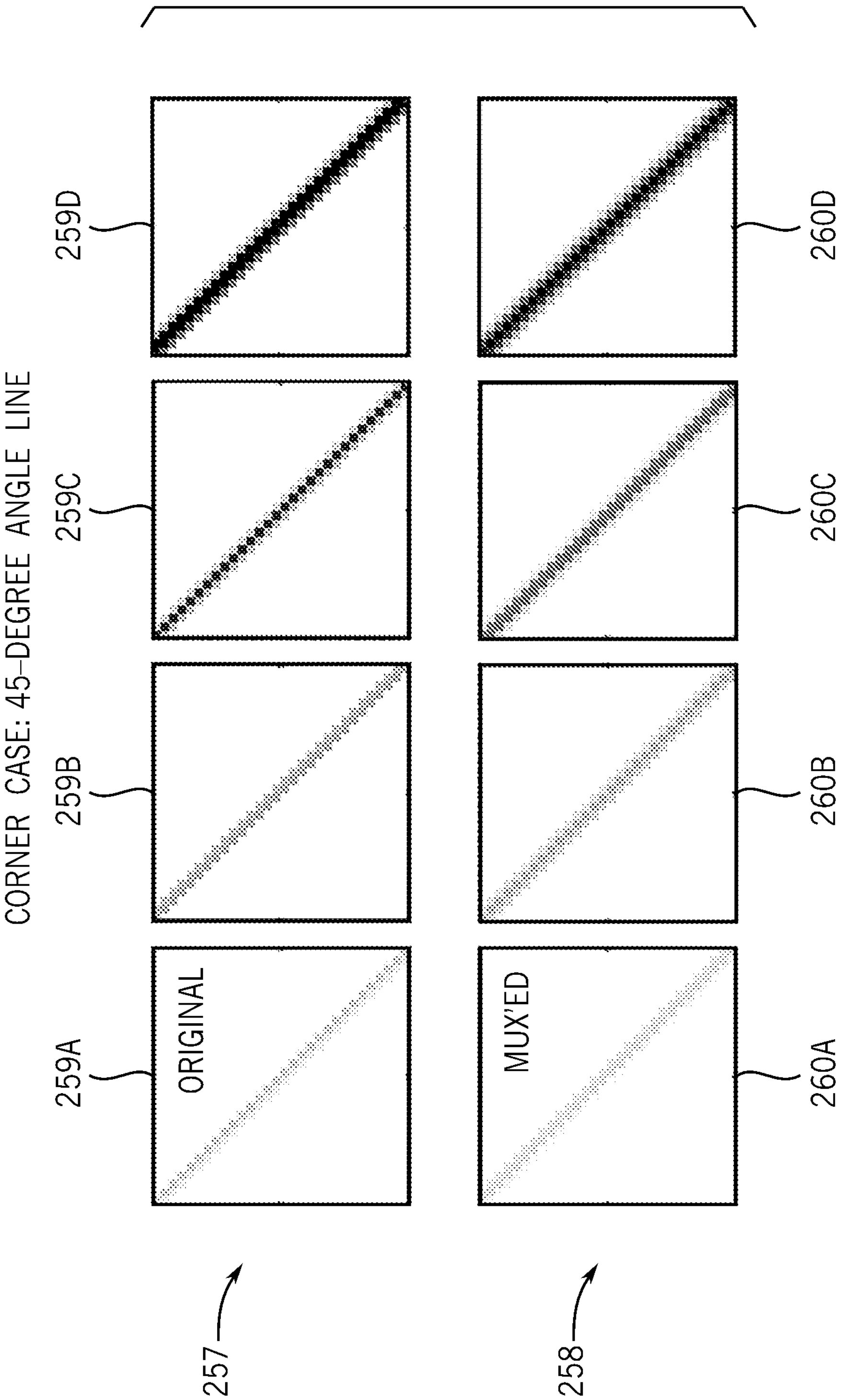
FIG. 23 shows an example of pixel grouping that may be used when the image content of the image data includes a 45-degree line.

Another corner case is shown in FIG. 23, which illustrates an example of a thin 45-degree-angle line as original full resolution content 257 and half-resolution multiplexed content 258 (e.g., grouped by row as in FIG. 18). Original content 259A, 259B, 259C, and 259D represent 45-degree-angle lines of increasing thickness. Multiplexed content 260A, 260B, 260C, and 260D represent corresponding half-resolution versions over two frames at double the frame rate of the original content 259A, 259B, 259C, and 259D. As in FIG. 22, the multiplexed content 258 preserves the total brightness of the original content 257.

Features such as those shown in FIGS. 22 and 23 may be improved by applying predistortion to the image frame in light of the pixel grouping. The predistortion may take place in the CPU processing 142, the GPU rendering 144, or the display pipeline processing 146 (e.g., as in FIG. 16). The predistortion may have the effect of concentrating image data along certain lines to prevent image data form being distributed, thereby sharpening edge features in half- or quarter-resolution image data.

Figure 24:
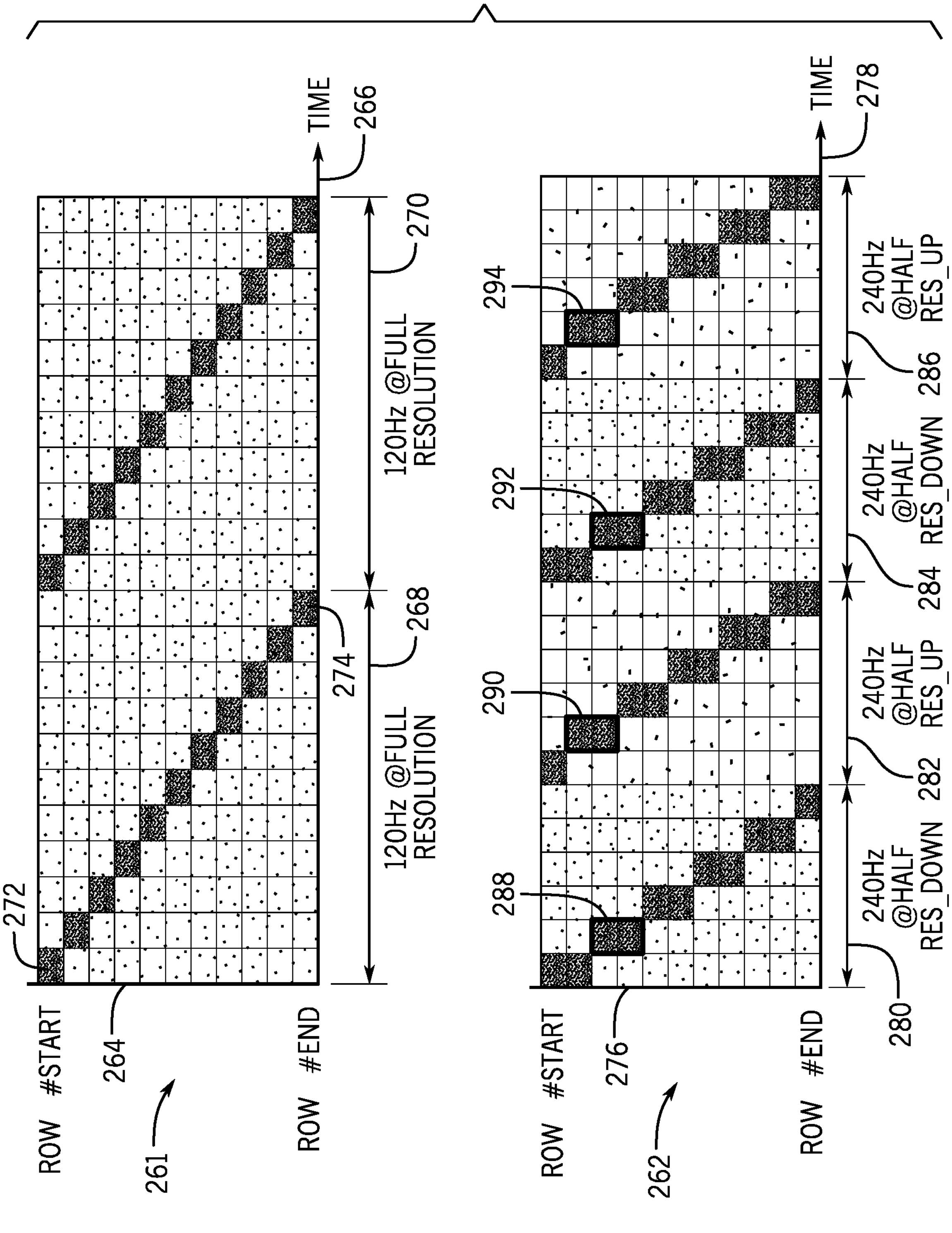
FIG. 24 is a timing diagram illustrating a relationship between two full-resolution image frames displayed at a first frame rate and four half-resolution image frames displayed with pixel grouping at a second frame rate double the first frame rate.

FIG. 24 illustrates a timing diagram 261 representing two full-resolution image frames displayed at a first frame rate and a timing diagram 262 representing four half-resolution image frames displayed with pixel grouping at a second frame rate double the first frame rate. In the example of FIG. 24, the timing diagram 261 illustrates the timing of programming display pixels by row (ordinate 264) from start to end over time (abscissa 266) over two frames 268 and 270 at a first frame rate. In the example of FIG. 24, the first frame rate is 120 Hz, but any other suitable frame rate may be used (e.g., 60 Hz, 240 Hz). Using the frame 268 as an example, display pixels may be programmed starting with a first row 272 down to a last row 274, repeating this pattern for every frame.

The timing diagram 262 illustrates the timing of programming groups of rows of display pixels. The timing diagram 262 illustrates programming by row (ordinate 276) from a starting row to an ending row over time (abscissa 278) over four frames 280, 282, 284, and 286 at a second frame rate double that of the first frame rate. The frames 280 and 282 may be understood to represent two subframes corresponding to the time taken for one frame of full-resolution image data. In the example of FIG. 24, since the first frame rate is shown to be 120 Hz, the second frame rate is shown to be 240 Hz, but any other suitable second frame rate may be used (e.g., 120 Hz, 480 Hz). Display pixels may be programmed starting with groups of two rows in every frame, which may alternate row grouping by frame, as shown by pixel groups 288, 290, 292, and 294.

Figure 25:
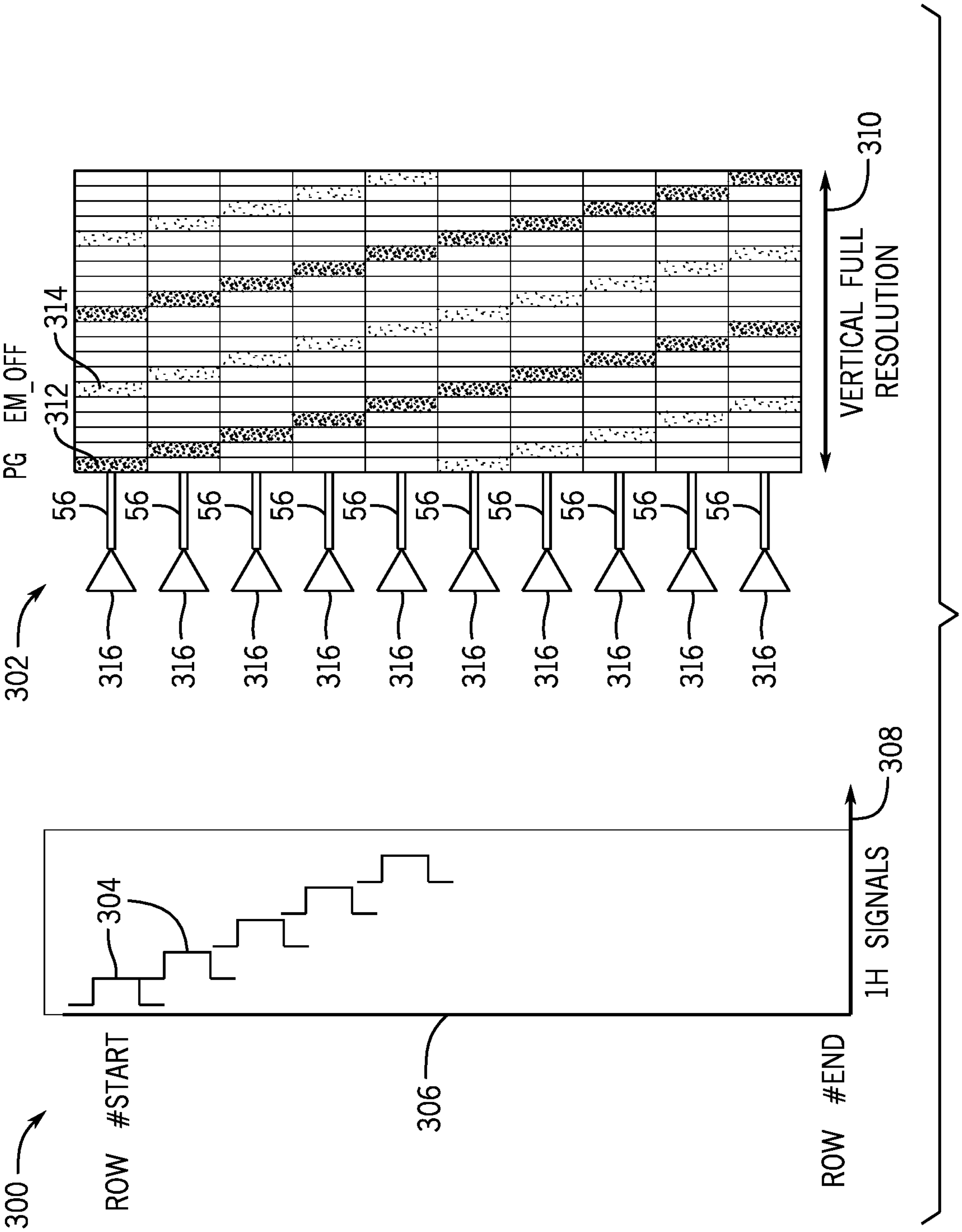
FIG. 25 illustrates the timing of an operation by display driver circuitry of the electronic display of FIG. 6 to display full-resolution image frames.
Figure 26:
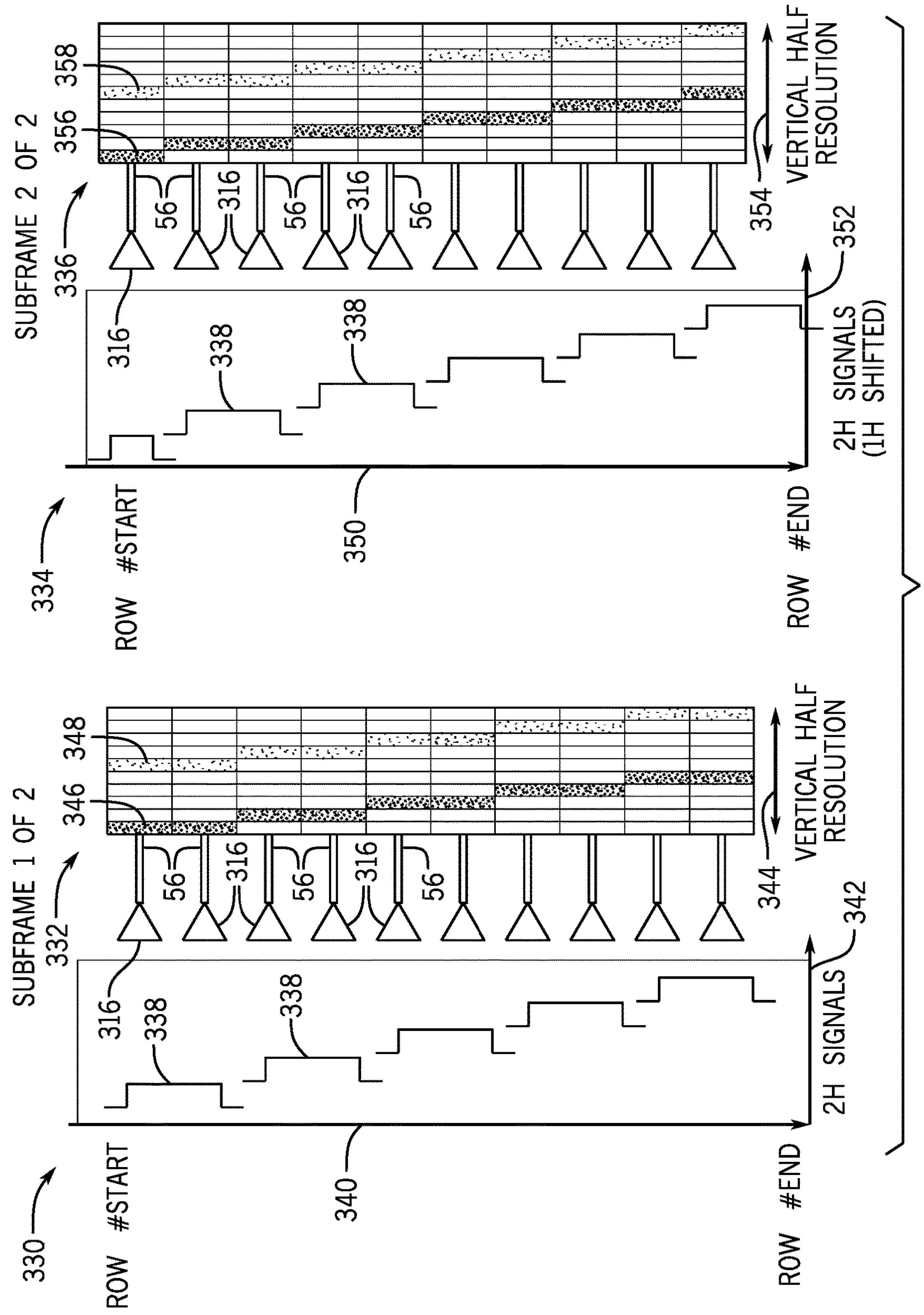
FIG. 26 illustrates the timing of an operation by display driver circuitry of the electronic display of FIG. 6 to display two vertical half-resolution image frames with vertical pixel grouping.

Pixel grouping may be carried out by driver circuitry of the electronic display 12A (e.g., FIG. 6) or the microdrivers of the electronic display 12B (e.g., FIG. 7). FIGS. 25 and 26 represent timing diagrams for gate-in-panel (GIP) circuitry to activate single rows for full resolution image data and multiple rows for lower-resolution image data, respectively, for the electronic display 12A. FIG. 25 shows a row timing diagram 300 for gate scan signals in relation to a display programming timing diagram 302 for programming full-resolution image data. The timing diagram 300 shows gate pulse signals 304 pulsing one at a time by row (ordinate 306) over time (abscissa 308). The pulses span one horizontal (H) row and thus may be considered 1H signals. The timing diagram 302 shows the programming of the same rows over time (abscissa 310). The gate pulses 304 may activate the rows one at a time to receive a programming signal 312 before later receiving an emission signal 314. The programming signal 312 may cause the display pixels of the rows to be programmed with image data when activated by gate drivers 316 that provide the gate pulses along scan lines 56 and the emission signal 314 may cause the programmed pixels to emit an amount of light corresponding to the image data with which the display pixels have been programmed.

FIG. 26 shows a row timing diagram 330 for gate scan signals in relation to a display programming timing diagram 332 for a first subframe and a row timing diagram 334 for gate scan signals in relation to a display programming timing diagram 336 for a second subframe for programming half-resolution image data. The timing diagram 330 shows gate pulse signals 338 pulsing two at a time by row (ordinate 340) over time (abscissa 342). The pulses span two horizontal (H) rows and thus may be considered 2H signals. The timing diagram 332 shows the programming of the same groups of rows over time (abscissa 344). The gate pulses 338 may activate the rows two at a time to receive a common programming signal 346 before later receiving an emission signal 348. The programming signal 346 may cause the display pixels of the rows to be programmed with image data and the emission signal 314 may cause the programmed pixels to emit an amount of light corresponding to the image data with which the display pixels have been programmed.

Likewise, the timing diagram 334 shows gate pulse signals 338 pulsing two at a time by row (ordinate 350) over time (abscissa 352). The pulses span two horizontal (H) rows shifted by 1 horizontal row compared to the timing diagram 330, and thus may be considered 2H signals (1H shifted). The timing diagram 336 shows the programming of the same groups of rows over time (abscissa 354). The gate pulses 338 may activate the rows two at a time to receive a common programming signal 356 before later receiving an emission signal 358. The programming signal 356 may cause the display pixels of the rows to be programmed with image data and the emission signal 358 may cause the programmed pixels to emit an amount of light corresponding to the image data with which the display pixels have been programmed. In total, the two subframes of FIG. 26 may represent two complete half-resolution frames that are displayed over the same period of time as the single full-resolution frame of FIG. 20.

Figure 27:
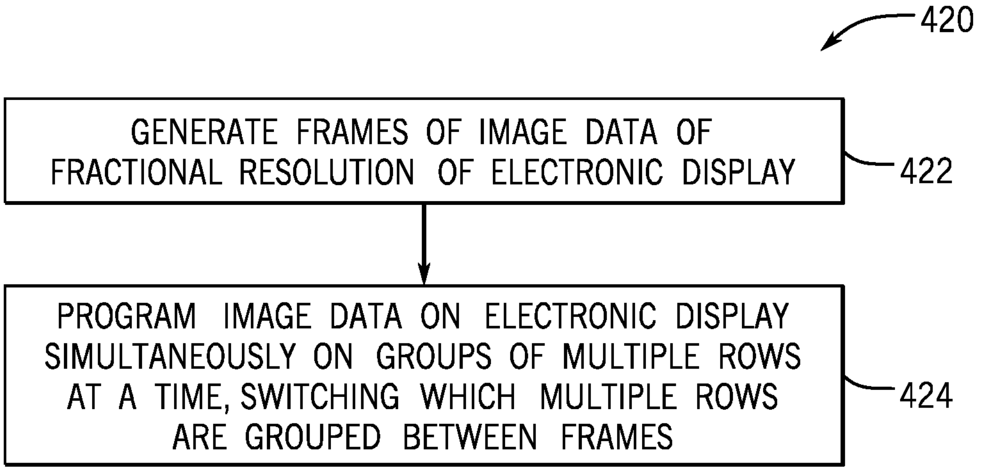
FIG. 27 is a flowchart of a method for displaying lower-resolution image data at a higher frame rate in pixel groups that shift from frame to frame.

FIG. 27 illustrates a flowchart 420 of a method for operating an electronic display 12 at a higher frame rate at a lower resolution while preserving image quality. The electronic device may enter a higher-frame rate mode and generate image frames of image data having a fractional resolution of the electronic display (block 422). For example, the image data may be half-resolution, quarter-resolution, ⅛ resolution, 1⁄16 resolution, or the like. The frame rate may or may not be correspondingly higher than some base frame rate. For example, the half-resolution image frames may be double that of a base frame rate. To save power, however, the frame rate may be at the same base frame rate, but because the image data is at a fractional resolution of the electronic display, generating the image frames may consume less energy (e.g., about half as much energy). Whether at the base frame rate or a higher frame rate, the image data may be programmed onto the electronic display in groups of rows and/or columns that are switched from frame to frame (block 424). Any suitable pattern may be used, such as those discussed above with reference to FIGS. 18-21.

Figure 28:
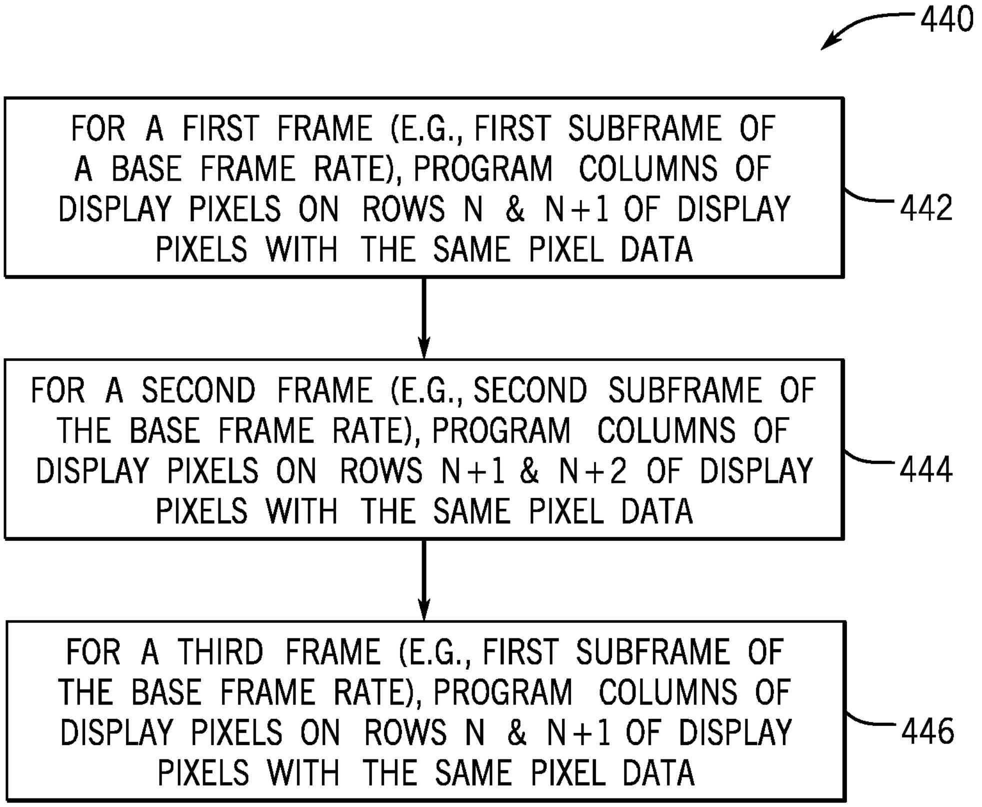
FIG. 28 is a flowchart of a method for switching pixel groups used to display the lower-resolution image data of FIG. 27.

A particular example of a method for programming half-resolution image data onto an electronic display in pixel groups is shown by a flowchart 440 of FIG. 28. For a first frame (e.g., a first subframe of a base frame rate), image data may be programmed into columns of display pixels on a first set of rows (e.g., N and N+1) such that two display pixels of each column are programmed with the same image data (block 442). For a second frame (e.g., a second subframe of a base frame rate), image data may be programmed into columns of display pixels on a second set of rows (e.g., N+1 and N+2) such that two display pixels of each column are programmed with the same image data (block 444). For a third frame (e.g., another first subframe of the base frame rate), image data may be programmed into columns of display pixels on the first set of rows (e.g., N and N+1) such that two display pixels of each column are programmed with the same image data (block 446). This process may continue as long as the electronic device is operating in a higher-frame-rate, lower-resolution mode.

Figure 29:
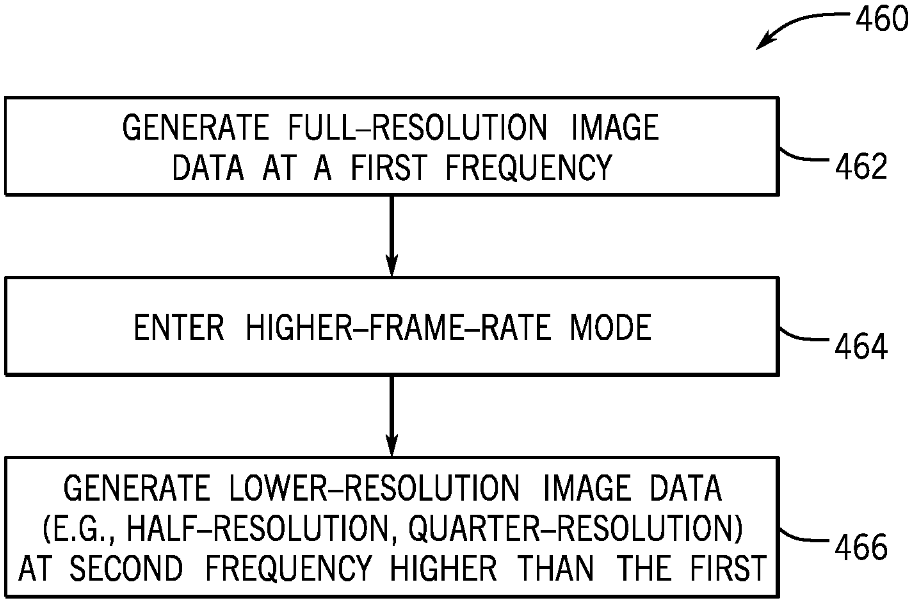
FIG. 29 is a flowchart of a method for operating in full-resolution and lower-resolution modes.

The electronic display 12 may operate in multiple pixel grouping modes at multiple different frame rates (e.g., full resolution at a base frame rate, lower-resolution at a higher frame rate). For example, as shown by a flowchart 460 of FIG. 29, an electronic device may be operating at full-resolution by generating image frames of full-resolution image data at a first frequency (block 462). At some point, the electronic device may enter a higher-frame-rate mode (block 464). For example, the electronic device may begin to display fast-moving content (e.g., fast-moving video content that could show motion blur, fast scrolling, video game content) or may be displaying content for which low latency is prioritized (e.g., certain video game content). In the higher-frame-rate mode, the electronic device may generate lower resolution image data at a second frequency higher than the first (block 466). For example, the electronic device may generate half-resolution image data at double the previous frame rate or generate quarter-resolution image data at four times the previous frame rate. Additionally or alternatively, the frame rate may not increase but image data may be generated at the lower resolution to save power.

Figure 30:
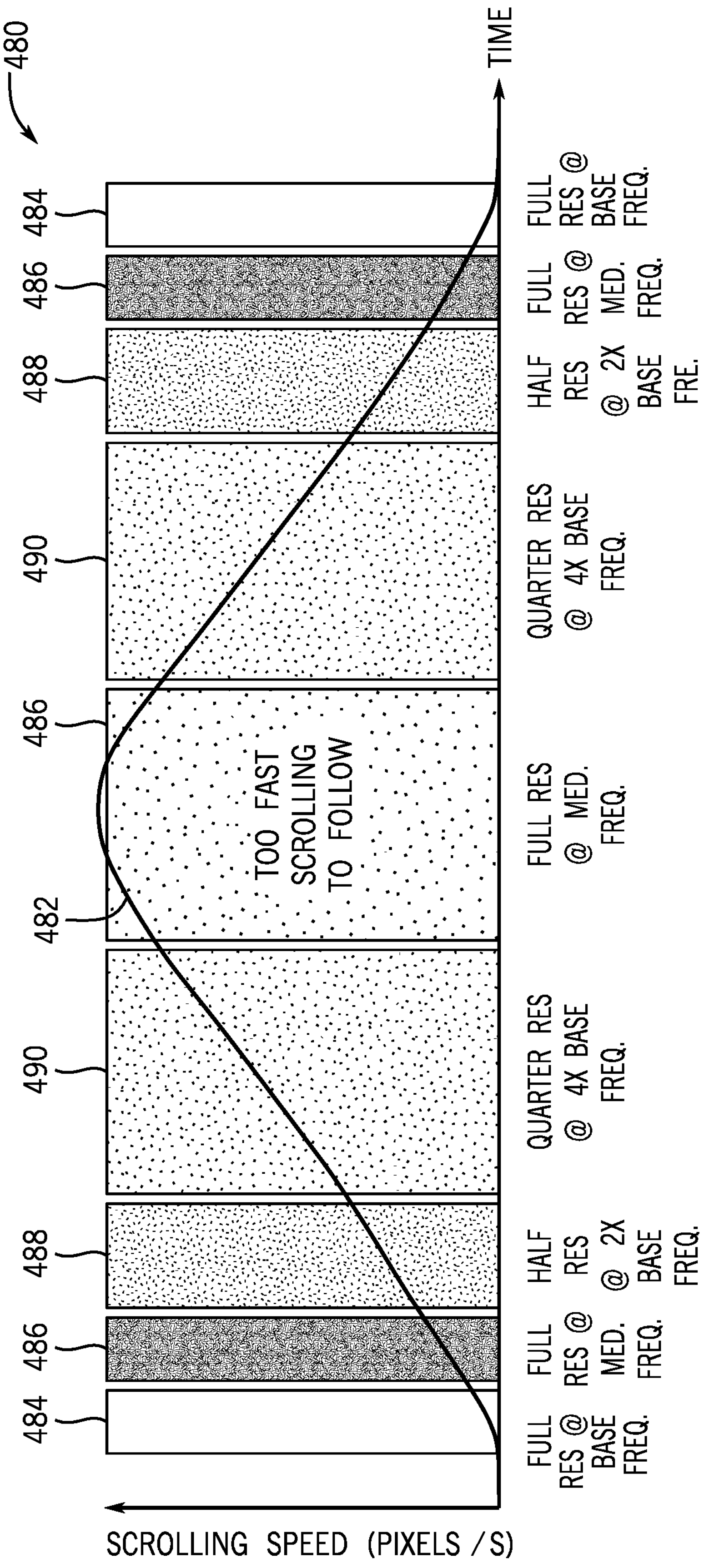
FIG. 30 is a diagram illustrating an operation of the electronic device in which frame rate may be adjusted based on a rate of scrolling on an electronic display.

FIG. 30 represents a timing diagram 480 showing various frame rates that may be used as a scrolling speed 482 in units of pixels per second (ordinate) changes over time (abscissa). When scrolling begins, the content of the screen is moving slowly, and thus the electronic device may generate and display image data at a first frame rate at full resolution in a first mode 484 (e.g., a base frequency, such as 30 Hz, 60 Hz, or 120 Hz). As the scrolling speed 482 increases beyond a first threshold, the electronic device may generate and display image data at a slightly higher medium frame rate at the full resolution in a second mode 486 (e.g., 40 Hz, 80 Hz, 150 Hz). When the movement of elements on the display (e.g., the scrolling speed 482) reaches a second threshold, the electronic device may enter a higher-frame-rate mode where the electronic device may generate and display image data at an even higher frame rate at half-resolution in a third mode 488 (e.g., double the base frequency, 60 Hz, 120 Hz, 240 Hz). When the movement of elements on the display (e.g., the scrolling speed 482) reaches a third threshold, the electronic device may enter an even higher-frame-rate mode where the electronic device may generate and display image data at an even higher frame rate at quarter-resolution in a fourth mode 490 (e.g., four times the base frequency, 120 Hz, 240 Hz, 480 Hz). At some point, when the movement of elements on the display (e.g., the scrolling speed 482) reaches a fourth threshold, it may be so fast that the human eye may not be able to follow the motion. To save power, the electronic device may return to the second mode 486. In some cases, above the third threshold, the resolution may remain lower (e.g., quarter-resolution or half-resolution) but at a lower frame rate to save more power. As the movement of the elements on the display (e.g., the scrolling speed 482) gradually drops, the electronic display may correspondingly operate in the modes 490, 488, and 486, until motion slows to below the first threshold and the electronic device operates in the mode 484.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display comprising:

a plurality of rows of display pixels; and driving circuitry configured to:

receive a first frame of image data and drive a first set of adjacent groups of rows using the first frame of image data, wherein each group of the adjacent groups of rows has an equal number of rows comprising two or more adjacent rows at a time; and receive a second frame of image data and drive a second set of adjacent groups of rows of the equal number using the second frame of image data, wherein the second set of adjacent groups of rows partially overlaps with the first set of adjacent groups of rows.

2. The electronic display of claim 1, wherein the equal number of rows is an even number of rows.

3. The electronic display of claim 1, wherein the first set of adjacent groups of rows comprises repeating groups of rows starting at rows N and N+1 and the second set of adjacent groups of rows comprises repeating groups of rows starting at rows numbered N+1 and N+2, wherein N is an integer greater than zero.

4. The electronic display of claim 1, wherein the first frame of image data comprises a resolution having a number of rows that is a fraction or the fraction plus one or more odd remainders of the plurality of rows of display pixels of the electronic display.

5. The electronic display of claim 1, wherein the first frame of image data comprises half-resolution image data having half the number of rows of the plurality of rows of display pixels of the electronic display.

6. The electronic display of claim 1, wherein the first frame of image data comprises quarter-resolution image data having one-fourth the number of rows of the plurality of rows of display pixels of the electronic display.

7. The electronic display of claim 1, wherein the driving circuitry is configured to drive the first set of adjacent groups of rows in groups of adjacent columns driven with pixel data of the image data that is the same for all display pixels in each combination of a group of rows and a group of columns.

8. The electronic display of claim 1, wherein the plurality of rows of display pixels comprise organic light emitting diode or liquid crystal pixels and the driving circuitry comprises a scan driver configured to drive two or more adjacent rows.

9. The electronic display of claim 1, wherein the plurality of rows of display pixels comprise micro-LED pixels of a local passive matrix and the driving circuitry comprises a microdriver configured to drive two or more adjacent rows of the local passive matrix at a time.

10. An electronic display comprising:

a plurality of rows of display pixels, wherein the plurality of rows of display pixels comprise micro-LED pixels of a local passive matrix; and driving circuitry configured to receive a first frame of image data and drive a first set of adjacent groups of rows using the first frame of image data, wherein each group of the adjacent groups of rows has an equal number of rows comprising two or more adjacent rows at a time, wherein the driving circuitry comprises a microdriver configured to drive two or more adjacent rows of the local passive matrix at a time, wherein the microdriver is configured to time-multiplex driving of different groups of rows over multiple subframes to perform subframe dithering corresponding to the first frame of image data over the multiple subframes.

11. The electronic display of claim 10, wherein the microdriver is configured to generate the multiple subframes at least in part by calculating at least two subframes of image data based on the first frame of image data, wherein each of the at least two subframes has a lower row resolution than the first frame of image data.

12. The electronic display of claim 1, wherein the driving circuitry is configured to:

receive successive frames of image data that have a fractional row resolution of the electronic display or the fractional row resolution plus one or more odd remainders; and cause the electronic display to display the successive frames of image data in groups of rows corresponding to the fractional row resolution that switch from frame to frame.

13. An electronic display comprising:

a plurality of rows of display pixels; and driving circuitry configured to receive a first frame of image data and drive a first set of adjacent groups of rows using the first frame of image data, wherein each group of the adjacent groups of rows has an equal number of rows comprising two or more adjacent rows at a time, wherein the driving circuitry is configured to:

receive successive frames of image data that have a fractional row resolution of the electronic display or the fractional row resolution plus one or more odd remainders; and cause the electronic display to display the successive frames of image data in groups of rows corresponding to the fractional row resolution that switch from frame to frame; and wherein the driving circuitry is configured to:

receive successive frames of image data having a full row resolution of the electronic display at a first frame rate before receiving the successive frames of data having the fractional row resolution of the electronic display or the fractional row resolution plus one or more odd remainders.

14. The electronic display of claim 13, wherein the successive frames of image data having the fractional row resolution of the electronic display are received at a second frame rate.

15. The electronic display of claim 14, wherein the second frame rate is higher than the first frame rate.

16. The electronic display of claim 14, wherein the fractional row resolution or the fractional row resolution plus one or more odd remainders of the electronic display comprises half of the rows of the electronic display or one less than half of the rows of the electronic display, and wherein the second frame rate is double the first frame rate.

17. The electronic display of claim 14, wherein the fractional row resolution or the fractional row resolution plus one or more odd remainders of the electronic display comprises one fourth of the rows of the electronic display or one less than or three less than one fourth of the rows and wherein the second frame rate is four times the first frame rate.

18. The electronic display of claim 12, wherein the driving circuitry is configured to enter a mode to receive the successive frames of image data having the fractional row resolution or the fractional row resolution plus one or more odd remainders of the electronic display based on motion of image content exceeding a threshold.

19. The electronic display of claim 18, wherein the motion of image content exceeding the threshold is based on a scrolling rate.

20. The electronic display of claim 1, wherein the driving circuitry is configured to:

receive frames of image data having a fractional row resolution or a fractional row resolution plus one or more odd remainders of the electronic display at a first frame rate; and program the frames of image data onto display pixels in groups of rows that switch from frame to frame.

21. The electronic display of claim 20, wherein the groups of rows switch from frame to frame by one row.

22. The electronic display of claim 1, wherein the driving circuitry is configured to:

drive a first set of adjacent display pixels of the first set of adjacent groups of rows using a first pixel value of the first frame of image data; and drive a second set of adjacent display pixels of the second set of adjacent groups of rows using a second pixel value of the second frame of image data.

* * * * *